US010276900B2

United States Patent
Kawano et al.

(10) Patent No.: US 10,276,900 B2
(45) Date of Patent: Apr. 30, 2019

(54) RECHARGEABLE BATTERY, CHARGING SYSTEM, AND ELECTRONIC DEVICE

(71) Applicant: FUJITSU LIMITED, Kawasaki-shi, Kanagawa (JP)

(72) Inventors: Hiroyasu Kawano, Ebina (JP); Akiyoshi Uchida, Akashi (JP); Satoshi Shimokawa, Kawasaki (JP); Kiyoto Matsui, Miki (JP); Kazuyuki Ozaki, Machida (JP); Masakazu Taguchi, Kobe (JP)

(73) Assignee: FUJITSU LIMITED, Kawasaki (JP)

( * ) Notice: Subject to any disclaimer, the term of this patent is extended or adjusted under 35 U.S.C. 154(b) by 128 days.

(21) Appl. No.: 14/926,743

(22) Filed: Oct. 29, 2015

(65) Prior Publication Data
US 2016/0049698 A1    Feb. 18, 2016

Related U.S. Application Data

(63) Continuation of application No. PCT/JP2013/063149, filed on May 10, 2013.

(51) Int. Cl.
*H02J 7/00* (2006.01)
*H01M 10/46* (2006.01)
(Continued)

(52) U.S. Cl.
CPC .......... *H01M 10/46* (2013.01); *H01M 2/022* (2013.01); *H02J 5/005* (2013.01); *H02J 7/0042* (2013.01); *H02J 7/02* (2013.01); *H02J 7/025* (2013.01); *H02J 50/12* (2016.02); *H02J 50/40* (2016.02); *H02J 50/70* (2016.02); *H01M 2220/30* (2013.01)

(58) Field of Classification Search
CPC .............................. H01M 10/46; H02J 7/025
USPC ........................................................ 320/108
See application file for complete search history.

(56) References Cited

U.S. PATENT DOCUMENTS

| | | | | |
|---|---|---|---|---|
| 5,212,026 A | * | 5/1993 | Mitchell | ................ H01M 2/02 180/68.5 |
| 6,208,115 B1 | * | 3/2001 | Binder | .................... H02J 7/022 307/66 |

(Continued)

FOREIGN PATENT DOCUMENTS

| | | |
|---|---|---|
| JP | 2005-117748 | 4/2005 |
| JP | 2005-124324 | 5/2005 |

(Continued)

OTHER PUBLICATIONS

International Search Report dated Jun. 18, 2013 in corresponding International Patent Application No. PCTJP2013/063149 (1 page).

(Continued)

*Primary Examiner* — Richard Isla
*Assistant Examiner* — Johali A Torres Ruiz
(74) *Attorney, Agent, or Firm* — Fujitsu Patent Center

(57) ABSTRACT

A rechargeable battery includes: a battery body including a cylindrical outer peripheral side surface; and a power receiving coil wound in at most a single layer around the outer peripheral side surface, and electrically connected to the battery body. The power receiving coil is helically wound around the outer peripheral side surface while forming a space from which the outer peripheral side surface is exposed.

17 Claims, 38 Drawing Sheets

(51) Int. Cl.
*H02J 7/02* (2016.01)
*H02J 50/12* (2016.01)
*H02J 50/40* (2016.01)
*H02J 50/70* (2016.01)
*H02J 5/00* (2016.01)
*H01M 2/02* (2006.01)

(56) References Cited

U.S. PATENT DOCUMENTS

| | | | |
|---|---|---|---|
| 7,511,454 B1 | 3/2009 | Legg | |
| 7,525,283 B2* | 4/2009 | Cheng | H01F 3/02 320/108 |
| 8,061,016 B2* | 11/2011 | Maher | H01F 41/048 29/599 |
| 2004/0246084 A1* | 12/2004 | Matsutani | H01F 17/04 336/5 |
| 2010/0006913 A1 | 1/2010 | Lin et al. | |
| 2010/0052431 A1* | 3/2010 | Mita | B60L 11/182 307/104 |
| 2011/0086256 A1* | 4/2011 | Julstrom | H01F 38/14 429/121 |
| 2011/0087299 A1* | 4/2011 | Ameri | A61N 1/056 607/2 |
| 2011/0163609 A1 | 7/2011 | Wada et al. | |
| 2011/0241617 A1 | 10/2011 | Hoffman et al. | |
| 2011/0298294 A1* | 12/2011 | Takada | B60L 11/182 307/104 |
| 2012/0025626 A1 | 2/2012 | Komiyama | |
| 2013/0033111 A1 | 2/2013 | Kawamoto et al. | |
| 2013/0034760 A1* | 2/2013 | Otts | H01M 4/668 429/94 |
| 2014/0176067 A1* | 6/2014 | Suzuki | H01M 10/46 320/108 |

FOREIGN PATENT DOCUMENTS

| | | |
|---|---|---|
| JP | 2010-021388 | 1/2010 |
| JP | 2010-183706 | 8/2010 |
| JP | 2011-142748 | 7/2011 |
| JP | 2012-034494 | 2/2012 |
| JP | 2013-038826 | 2/2013 |
| JP | 2013-038967 | 2/2013 |

OTHER PUBLICATIONS

JPO—Office Action of Japanese Patent Application No. 2015-515729 dated Sep. 5, 2017, with machine translation. ** The remaining references cited in the JPOA were previously submitted in the IDS filed on Oct. 29, 2015.

* cited by examiner

FIG.16

| | | |
|---|---|---|
| POWER TRANSMISSION SIDE | RADIUS r1 OF POWER TRANSMITTING COIL 31 | 73.345mm |
| | DIAMETER φ1 OF CROSS SECTION OF POWER TRANSMITTING COIL 31 | 1mm |
| | WINDING PITCH P OF POWER TRANSMITTING COIL 31 | 2mm |
| | FREQUENCY OF ALTERNATING-CURRENT POWER SUPPLY 33 | 6.78MHz |
| | CLEARANCE Δ BETWEEN POWER TRANSMITTING COIL 31 AND POWER RECEIVING COIL 36 | 1.5mm |
| | CAPACITANCE OF FIRST CAPACITOR 34 | 23pF |
| POWER RECEPTION SIDE | DIAMETER R1 OF POWER RECEIVING COIL 36 | 10mm |
| | NUMBER OF TURNS OF POWER RECEIVING COIL 36 | 1.5 TURNS |
| | DIAMETER φ2 OF CROSS SECTION OF POWER RECEIVING COIL 36 | 0.5mm |
| | DEPTH OF POWER RECEIVING COIL 36 | 43mm |
| | CAPACITANCE OF SECOND CAPACITOR 41 | 4130pF |
| MAGNETIC SHEET 39 | DIAMETER R2 | 8.8mm |
| | THICKNESS t | 0.2mm |
| | RELATIVE MAGNETIC PERMEABILITY | 200 (@6.78MHz) |
| | MAGNETIC LOSS (tan δ) | 0.01 (@6.78MHz) |
| | CONDUCTIVITY | 2μS/m |
| | CLEARANCE T BETWEEN MAGNETIC SHEET 39 AND POWER RECEIVING COIL 36 | 0.1mm |

RECHARGEABLE BATTERY, CHARGING SYSTEM, AND ELECTRONIC DEVICE

CROSS-REFERENCE TO RELATED APPLICATION

This application is a continuation of International Patent Application No. PCT/JP2013/063149 filed May 10, 2013 and designated the U.S., the entire contents of which are incorporated herein by reference.

FIELD

The embodiments discussed herein are related to a rechargeable battery, a charging system, and an electronic device.

BACKGROUND

Rechargeable batteries which may be repeatedly charged are used in electronic devices such as mobile terminals. Methods of charging a rechargeable battery include a method of charging a rechargeable battery through metal contacts, and a wireless charging method of charging a battery without the intermediary of metal contacts or the like. Of these methods, the wireless charging method may contribute to convenience for a user because the user does not have to bring a battery into contact with metal contacts of a battery charger.

In the wireless charging method, a magnetic field is generated by supplying electric power from a power supply to a power transmitting coil, and the magnetic field causes a power receiving coil to generate an induced electromotive force. The power receiving coil is built in a battery, and the battery is charged by the induced electromotive force.

The wireless charging method is further categorized into an electromagnetic induction mode and a magnetic field resonance mode. These modes are distinguished from each other depending on a coupling coefficient between the power transmitting coil and the power receiving coil as well as on a Q factor. Here, a mode involving a small Q factor and a large coupling coefficient is often referred to as the electromagnetic induction mode. In contrast, a mode involving a large Q factor and a small coupling coefficient is often referred to as the magnetic field resonance mode.

According to the electromagnetic induction mode, the power receiving coil and the power transmitting coil have to be located face to face in order to improve power transmission efficiency. In this regard, the electromagnetic induction mode causes a constraint on a positional relation between the power receiving coil and the power transmitting coil, and is therefore inconvenient.

On the other hand, the magnetic field resonance mode is known to be capable of achieving adequate transmission efficiency without locating the power receiving coil and the power transmitting coil face to face. In this regard, the magnetic field resonance mode is a charging mode which is more convenient than the electromagnetic induction mode.

The wireless charging using the above-described magnetic field resonance mode still has room for improvement in light of further increase in the flexibility of the positional relation between the power receiving coil and the power transmitting coil.

SUMMARY

According to an aspect of the following disclosure, a rechargeable battery includes: a battery body including a cylindrical outer peripheral side surface; and a power receiving coil wound in at most a single layer around the outer peripheral side surface, and electrically connected to the battery body. The power receiving coil is helically wound around the outer peripheral side surface while forming a space from which the outer peripheral side surface is exposed.

According to another aspect of the disclosure, a charging system includes: a power transmitting coil wound around a first axis; a battery body including a cylindrical outer peripheral side surface, and defining a second axis as a longitudinal direction of the battery body; and a power receiving coil wound in at most a single layer around the outer peripheral side surface, and electrically connected to the battery body. The second axis is perpendicular to the first axis, and the power receiving coil is helically wound around the outer peripheral side surface while forming a space from which the outer peripheral side surface is exposed.

According to yet another aspect of the disclosure, an electronic device includes a rechargeable battery, and the rechargeable battery includes: a battery body with a cylindrical outer peripheral side surface; and a power receiving coil wound in at most a single layer around the outer peripheral side surface, and electrically connected to the battery body. The power receiving coil is helically wound around the outer peripheral side surface while forming a space from which the outer peripheral side surface is exposed.

The object and advantages of the invention will be realized and attained by means of the elements and combinations particularly pointed out in the claims.

It is to be understood that both the foregoing general description and the following detailed description are exemplary and explanatory and are not restrictive of the invention.

BRIEF DESCRIPTION OF DRAWINGS

FIG. 16 is a table which sets out conditions used in a simulation;

DESCRIPTION OF EMBODIMENTS

Items studied by the inventor of this application will be explained prior to the description of embodiments.

As mentioned above, the wireless charging method includes the electromagnetic induction mode and the magnetic field resonance mode.

Figure 1:
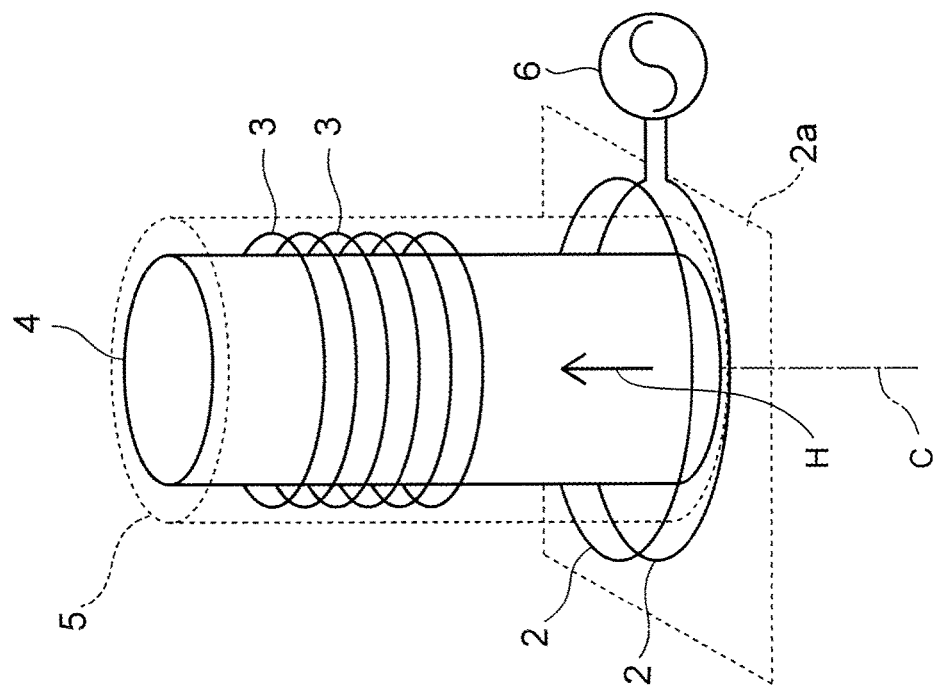
FIG. 1 is a schematic diagram of a charging system adopting an electromagnetic induction mode.

The electromagnetic induction mode out of these modes will be described with reference to FIG. 1. FIG. 1 is a schematic diagram of a charging system adopting the electromagnetic induction mode.

This charging system 1 includes a rechargeable battery 5 which is an object to be charged, and a power transmitting coil 2 configured to wirelessly send power to the rechargeable battery 5.

An alternating-current power supply 6 is connected to the power transmitting coil 2. A magnetic field H is generated around the power transmitting coil 2 by a current supplied from the alternating-current power supply 6 to the power transmitting coil 2.

On the other hand, the rechargeable battery 5 includes a battery body 4, and a power receiving coil 3 which is wound around an outer peripheral side surface of the battery body 4. An induced electromotive force is generated in the power receiving coil 3 by the above-mentioned magnetic field H, and the battery body 4 is charged by the induced electromotive force.

The above-mentioned induced electromotive force is proportional to the number of turns of the power receiving coil 3. For this reason, this charging system 1 may efficiently charge the battery body 4 while using a high induced electromotive force generated in the power receiving coil 3, by winding the power receiving coil 3 around the outer peripheral side surface of the battery body 4 without providing gaps between tracks of the wire and thus increasing the number of turns of the power receiving coil 3.

However, if a center axis C of the battery body 4 is inclined from a coil face 2a of the power transmitting coil 2, an interlinkage magnetic flux which penetrates the power receiving coil 3 is reduced and the electromotive force of the power receiving coil is deteriorated. It is therefore preferable to conduct position alignment between the power transmitting coil 2 and the battery body 4 in advance.

Figure 2:
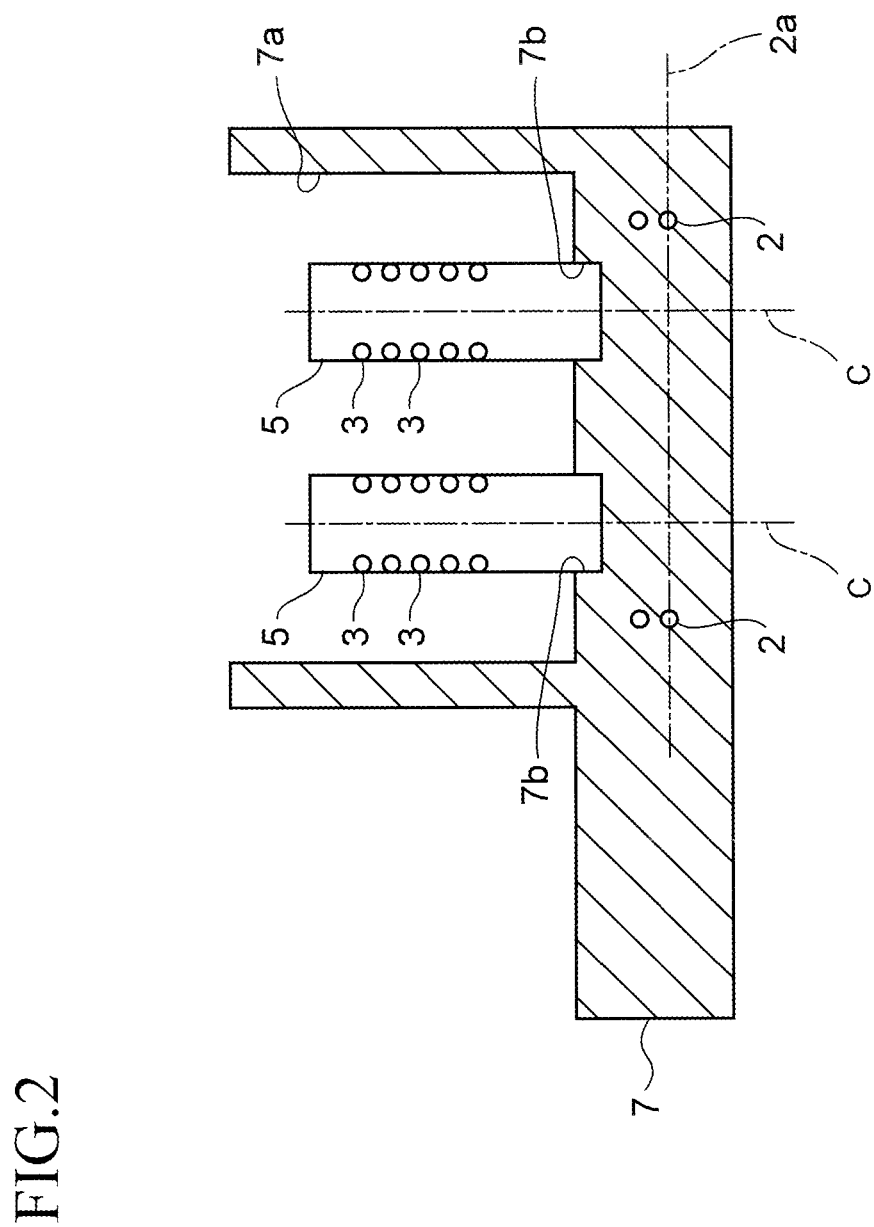
FIG. 2 is a schematic cross-sectional view of a jig used for position alignment of a power transmitting coil with battery bodies.

FIG. 2 is a schematic cross-sectional view of a jig used for the position alignment.

A jig 7 is used for simultaneously charging a plurality of rechargeable batteries 5 in accordance with the electromagnetic induction mode. The jig 7 includes a housing 7a which incorporates the above-described power transmitting coil 2 and houses the plurality of rechargeable batteries 5. A plurality of recesses 7b into which the vertically erected rechargeable batteries 5 are to be fitted are provided on a bottom surface of the housing 7a.

According to this configuration, center axes C of the rechargeable batteries 5 are oriented in the vertical direction by fitting the rechargeable batteries 5 into the recesses 7b. Thus, it is possible to prevent the center axes C from being inclined from the coil face 2a and to suppress reduction in the interlinkage magnetic flux penetrating each power receiving coil 3.

However, this method is inconvenient because a user has to perform position alignment between the jig 7 and the rechargeable batteries 5 and to fit the rechargeable batteries 5 into the respective recesses 7b.

A charging system adopting the magnetic field resonance mode for reducing such a burden of the position alignment will be considered as follows.

Figure 3:
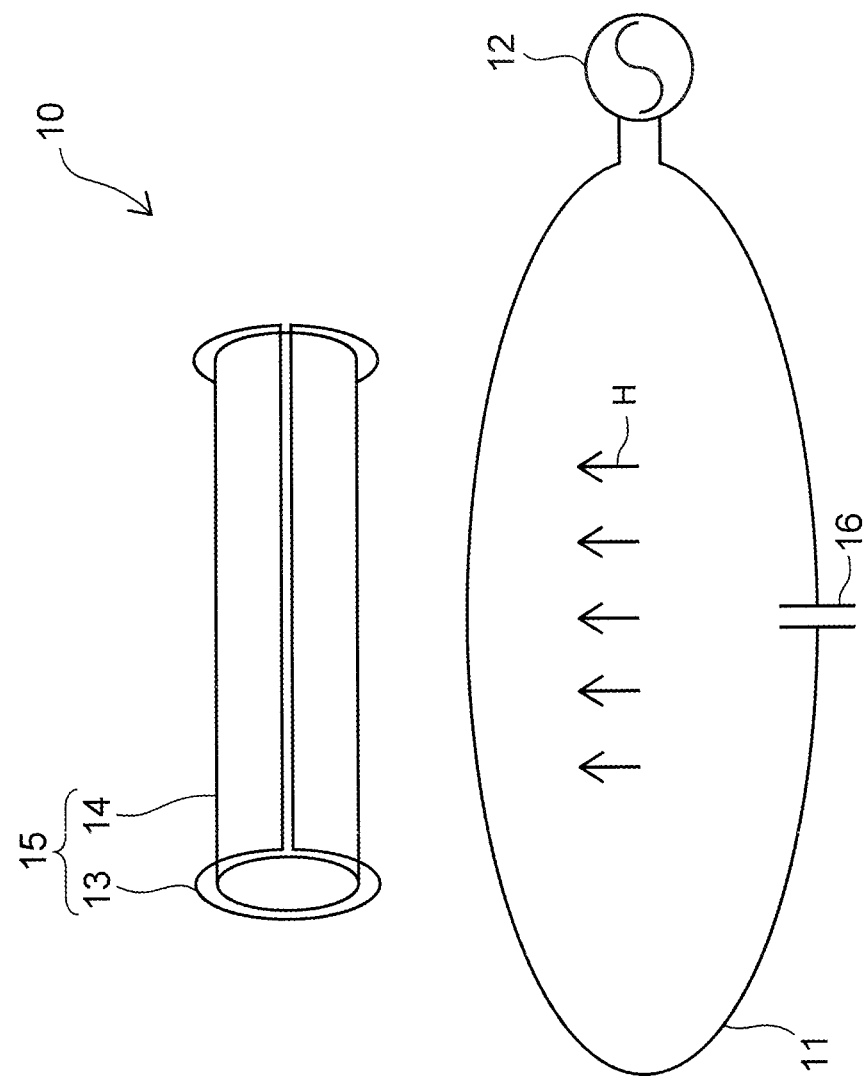
FIG. 3 is a schematic diagram of a charging system adopting a magnetic field resonance mode.

FIG. 3 is a schematic diagram of a charging system adopting the magnetic field resonance mode.

This charging system 10 includes a rechargeable battery 15 which is an object to be charged, and a power transmitting coil 11 configured to wirelessly send power to the rechargeable battery 15.

An alternating-current power supply 12 and a first capacitor 16 for resonance are connected to the power transmitting coil 11. A magnetic field H is generated around the power transmitting coil 11 by a current supplied from the alternating-current power supply 12 to the power transmitting coil 11.

On the other hand, the rechargeable battery includes a battery body 14 and a power receiving coil 13 which is wound around an outer peripheral side surface of the battery body 14.

The battery body 14 includes an electrolyte and electrodes, which are not illustrated therein, inside a tube made of metal. The battery body 14 is charged by an electromotive force generated on the power receiving coil 13 by reception of the above-mentioned magnetic field H.

Figure 4:
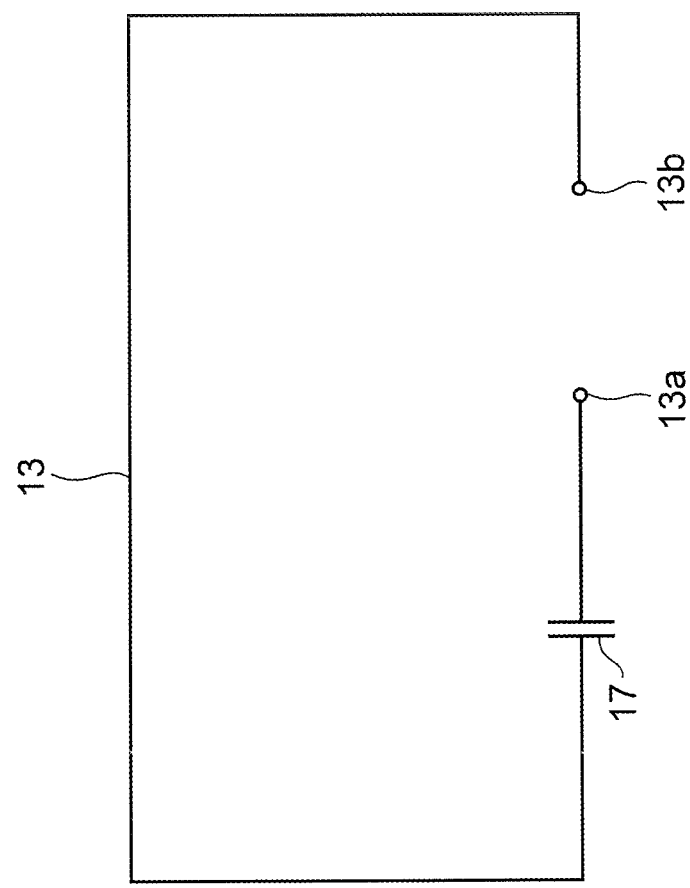
FIG. 4 is a diagram of an unwound power receiving coil used in the magnetic field resonance mode.

FIG. 4 is a diagram of the power receiving coil 13 in an unwound state.

As illustrated in FIG. 4, the power receiving coil 13 has a substantially rectangular unwound shape, and includes a first end portion 13a and a second end portion 13b. In actual use, the induced electromotive force generated in the power receiving coil 13 may be supplied to the battery body 14 by connecting the end portions 13a and 13b to a positive electrode and a negative electrode of the battery body 14, respectively.

In addition, the power receiving coil 13 is also provided with a second capacitor 17 for resonance.

The magnetic field resonance mode is designed to relax the position alignment tolerances between the coils 11 and 13 by increasing a Q factor of the power receiving coil 13, and the Q factor is known to be given by the following Formula (1). Here, the Q factor drops if resistance $R_{ohm}$ of the power receiving coil 13 is increased.

(Formula 1)

$$Q = \frac{\omega L}{R_{ohm} + R_{rad}} \quad (1)$$

In Formula (1), ω denotes an angular frequency of a current flowing in the power receiving coil 13, and L denotes inductance of the power receiving coil 13. Meanwhile, $R_{rad}$ denotes radiation resistance representing an electromagnetic wave radiated from the power receiving coil 13.

The rectangular power receiving coil 13 has a coil length shorter than that of the power receiving coil 3 densely wound as illustrated in FIG. 1, and therefore has smaller resistance $R_{ohm}$. Accordingly, the power receiving coil 13 may increase the Q factor according to Formula (1).

Moreover, by setting the unwound shape of the power receiving coil 13 into the rectangular shape as described above, an outer peripheral side surface of the battery body 14 is exposed largely from the power receiving coil 13, so that an interlinkage magnetic flux to penetrate the inside of the power receiving coil 13 may be increased.

As a result, a sufficient electromotive force is thought to be generated in the power receiving coil 13 even when the rechargeable battery 15 is in a state of being laid in a horizontal plane. Accordingly, it is no longer important to erect the rechargeable battery at the time of electric charging as illustrated in FIG. 1 and FIG. 2. Thus, this configuration is also thought to be capable of contributing to convenience for a user.

Figure 5:
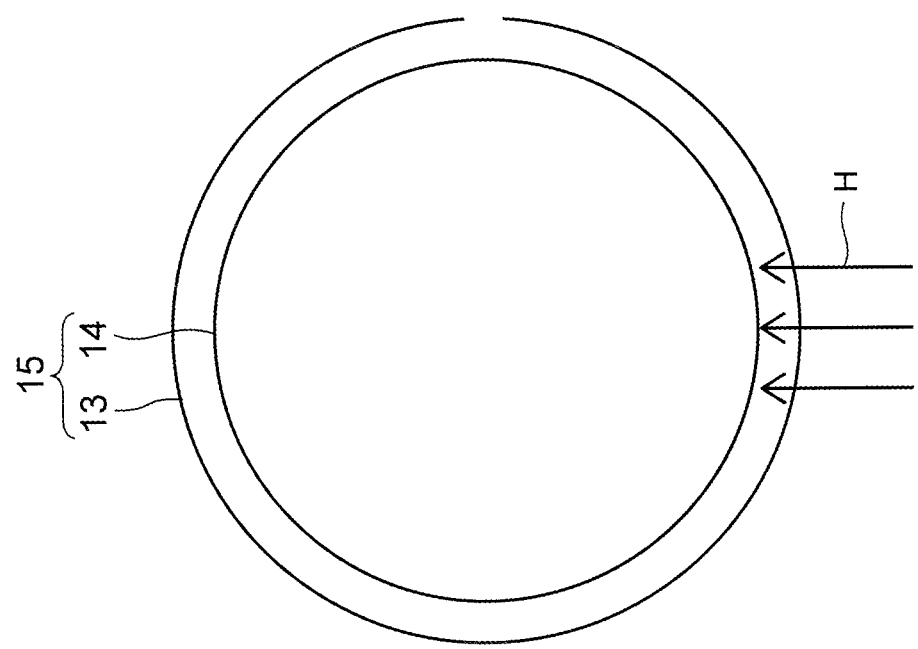
FIG. 5 is a side view of a rechargeable battery viewed from a bottom surface of a battery body.

FIG. 5 is a side view of the rechargeable battery 15 viewed from a bottom surface of the cylindrical battery body 14.

As illustrated in FIG. 5, the magnetic field H penetrating the inside of the power receiving coil 13 reaches the battery body 14. Since the battery body 14 includes the tube made of metal as described above, the magnetic field H generates an eddy current in the tube whereby energy of the magnetic field H is used for generation of the eddy current.

As a consequence, this mode has an advantage of a capability of charging the rechargeable battery 15 in the state of being laid in the horizontal plane as illustrated in FIG. 3. However, this mode also has a problem that the energy is not efficiently transferred between the power transmitting coil 11 and the power receiving coil 13.

Figure 6:
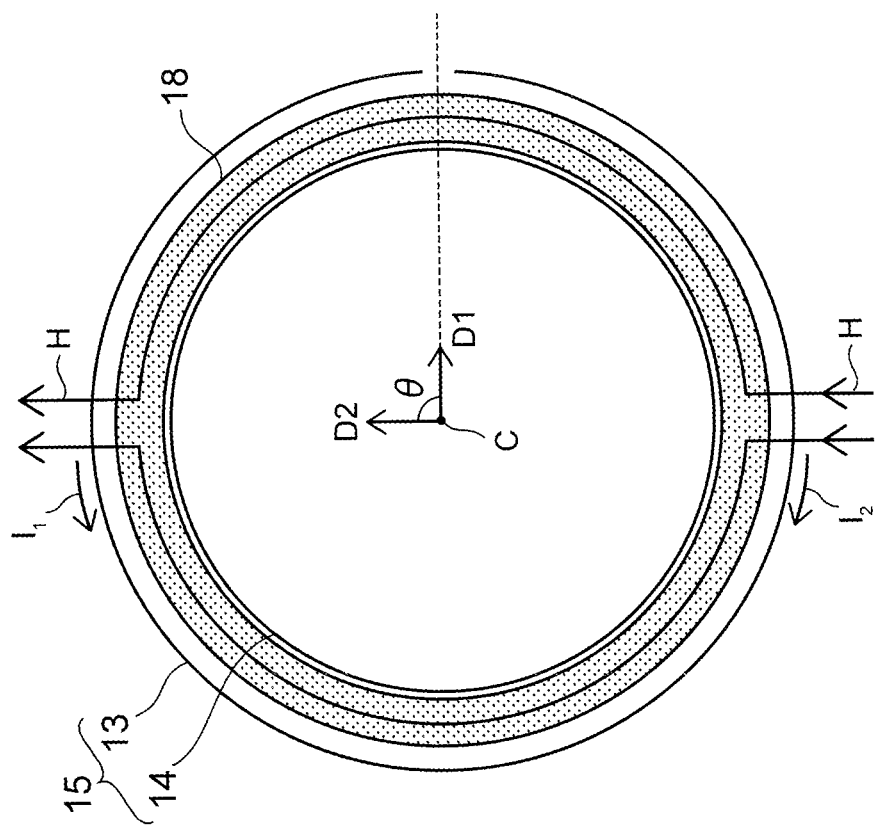
FIG. 6 is a side view of a rechargeable battery used for a study.

FIG. 6 is a side view of the rechargeable battery 15 devised to solve this problem.

In this example, a magnetic sheet 18 containing ferrite or a soft magnetic material is wrapped around the side surface of the battery body 14. Note that an unwound shape of the power receiving coil 13 is the rectangular shape as with the example in FIG. 4.

The magnetic sheet 18 has a feature of taking the magnetic field H into the inside. Accordingly, this configuration is thought to be capable of preventing the magnetic field H from reaching the battery body 14, suppressing wasteful consumption of the energy of the magnetic field H to generate the eddy current on the surface of the battery body 14, and thus effectively using the energy of the magnetic field H as the electromotive force in the power receiving coil 13.

However, part of the magnetic field H thus taken into the magnetic sheet 18 leaks out from an upper part of the battery body 14 and generates an induced current $I_1$ on the power receiving coil 13. The induced current $I_1$ has an opposite orientation to an orientation of an induced current $I_2$ generated on the power receiving coil 13 at a lower part of the battery body 14 by the magnetic field H.

Accordingly, it is not possible to supply a sufficient amount of the current to the battery body 14 by simply providing the magnetic sheet 18 as described above, because the induced currents $I_1$ and $I_2$ cancel each other.

The inventor of the present application simulates a relation between a roll angle θ in the horizontal plane of the rechargeable battery 15 and power transfer efficiency E.

Note that the roll angle θ is an angle between a direction D1 from the center axis C of the battery body 14 toward a portion where the power receiving coil 13 is not provided and a direction D2 of the magnetic field H in a side view. Here, a counterclockwise direction around the center axis C is defined as a positive direction.

Meanwhile, the efficiency E is defined as a ratio between the power of the alternating-current power supply 12 and the power induced in the power receiving coil 13.

Figure 7:
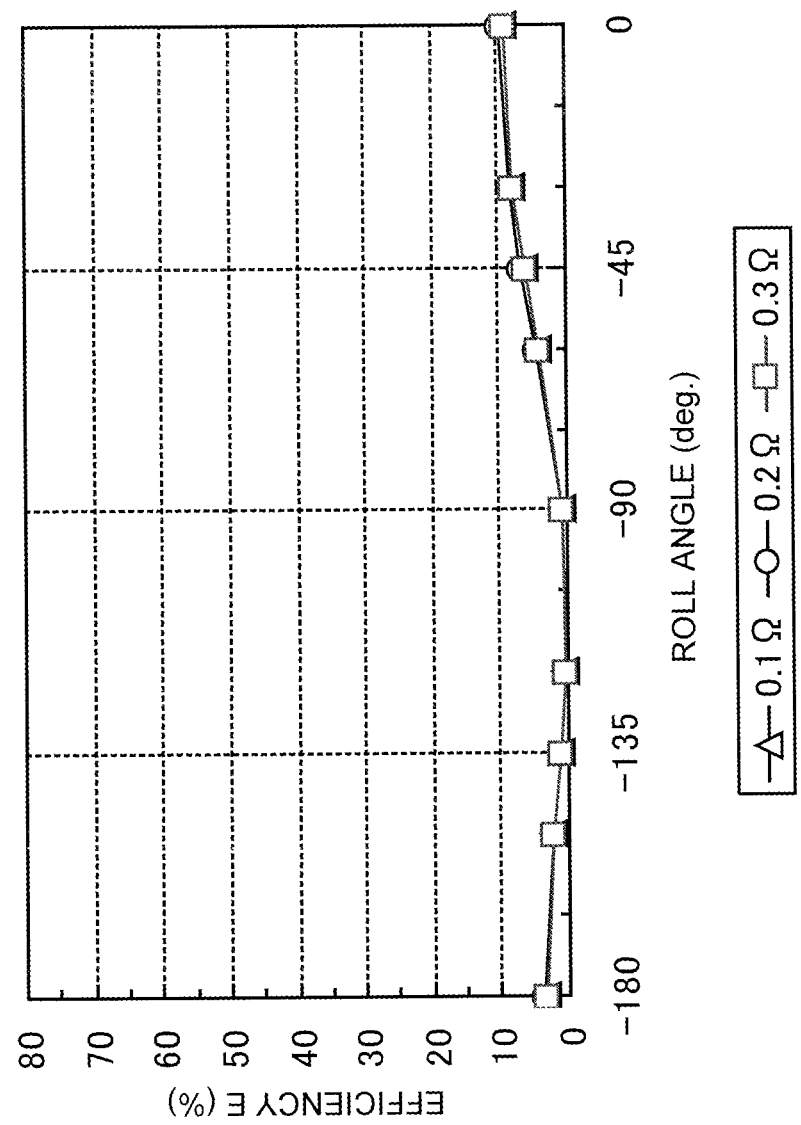
FIG. 7 is a graph obtained by simulating a relation between a roll angle of the rechargeable battery used for the study and power transfer efficiency.

A result of the simulation is illustrated in FIG. 7.

In this simulation, a load resistor to simulate internal resistance of the rechargeable battery 15 is connected in series to the power receiving coil 13, and calculation is performed for each case of the load resistors having resistances of 0.1Ω, 0.2Ω, and 0.3Ω.

As illustrated in FIG. 7, the efficiency E falls below 10% at almost all roll angles θ. Since the efficiency E is preferably equal to or above 50% from a practical perspective, it is found out that this rechargeable battery 15 is of no practical use.

Figure 8:
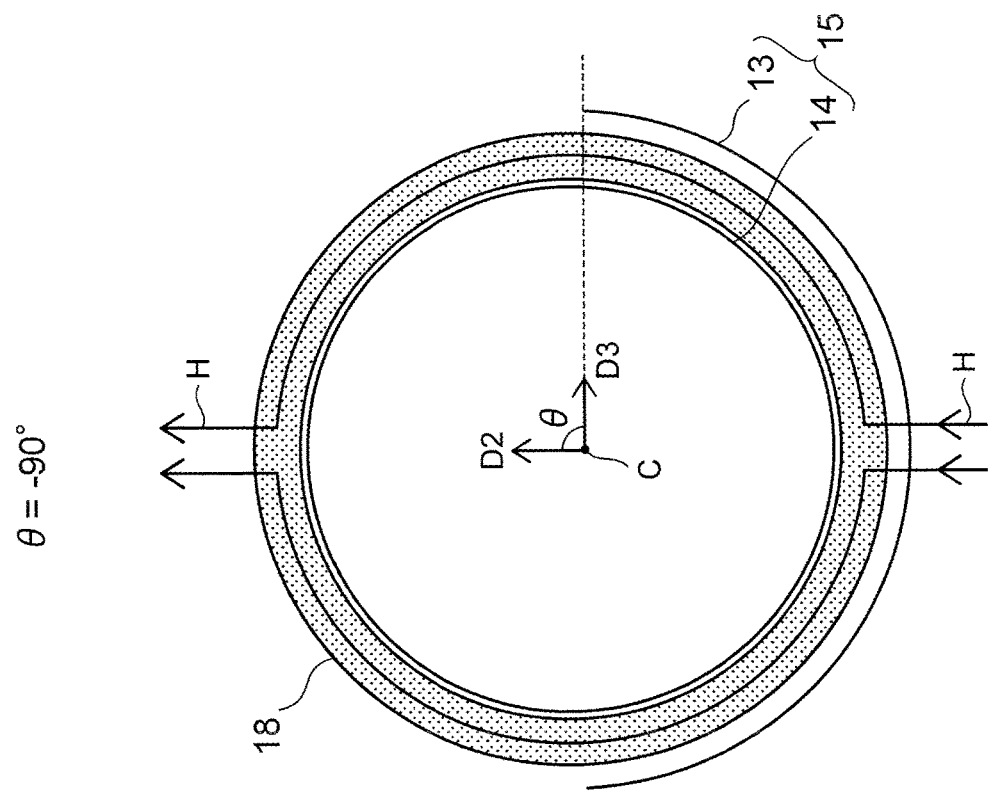
FIG. 8 is a cross-sectional view of a rechargeable battery studied for inhibiting induced currents from cancelling each other.

FIG. 8 is a cross-sectional view of the rechargeable battery 15 devised to inhibit the induced currents from cancelling each other as mentioned above.

In this example, the power receiving coil 13 having the rectangular unwound shape as illustrated in FIG. 4 is wound on a half round of the cylindrical battery body 14.

Note that the roll angle θ in this example is an angle between a direction D3 from the center axis C of the battery body 14 toward an end portion of the power receiving coil 13 and the direction D2 of the magnetic field H in a side view. Here, the counterclockwise direction around the center axis C is defined as the positive direction.

In this way, when the roll angle θ is equal to −90°, the power receiving coil 13 is no longer exposed to the magnetic field H leaking out from the upper part of the battery body 14. This makes it possible to inhibit the induced currents generated on the upper part and the lower part of the battery body 14 from cancelling each other.

Figure 9:
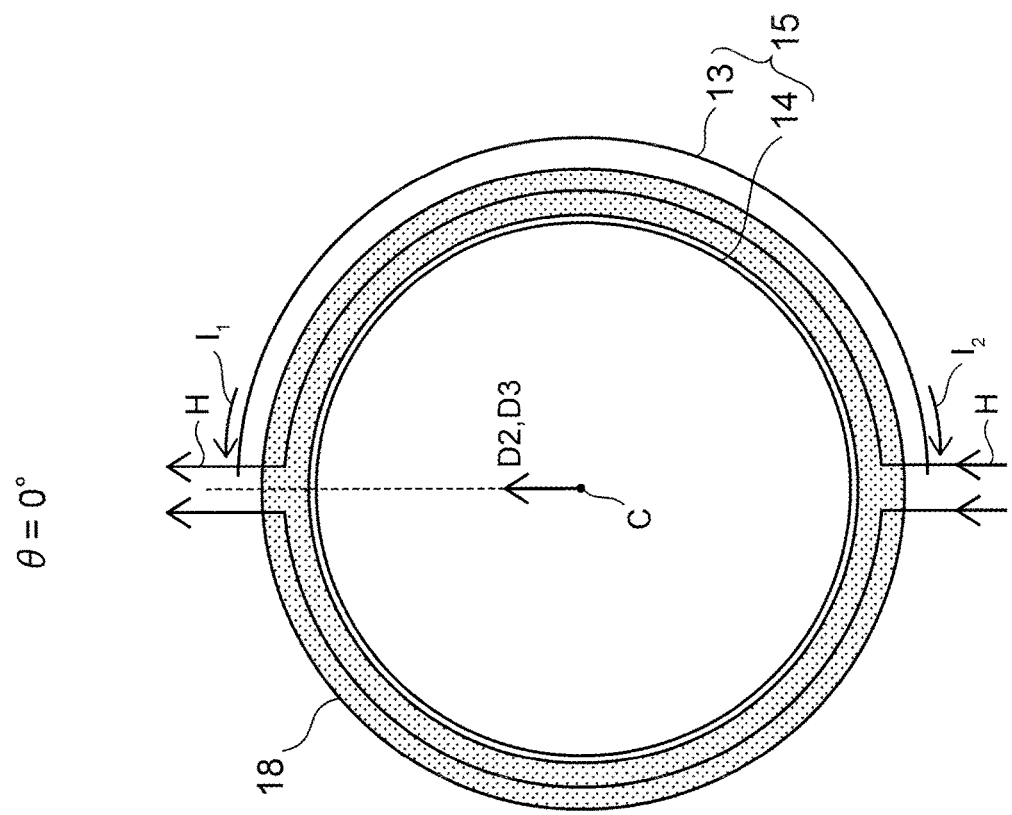
FIG. 9 is a cross-sectional view of the rechargeable battery of FIG. 8 when its roll angle is set to 0°.

On the other hand, FIG. 9 is a side view of the rechargeable battery 15 when the roll angle θ is equal to 0°.

In this case, the power receiving coil 13 is exposed to the magnetic field H at the upper part and the lower part of the rechargeable battery 15. As a consequence, the induced currents $I_1$ and $I_2$ flowing on the power receiving coil 13 cancel each other as with the example of FIG. 6.

Figure 10:
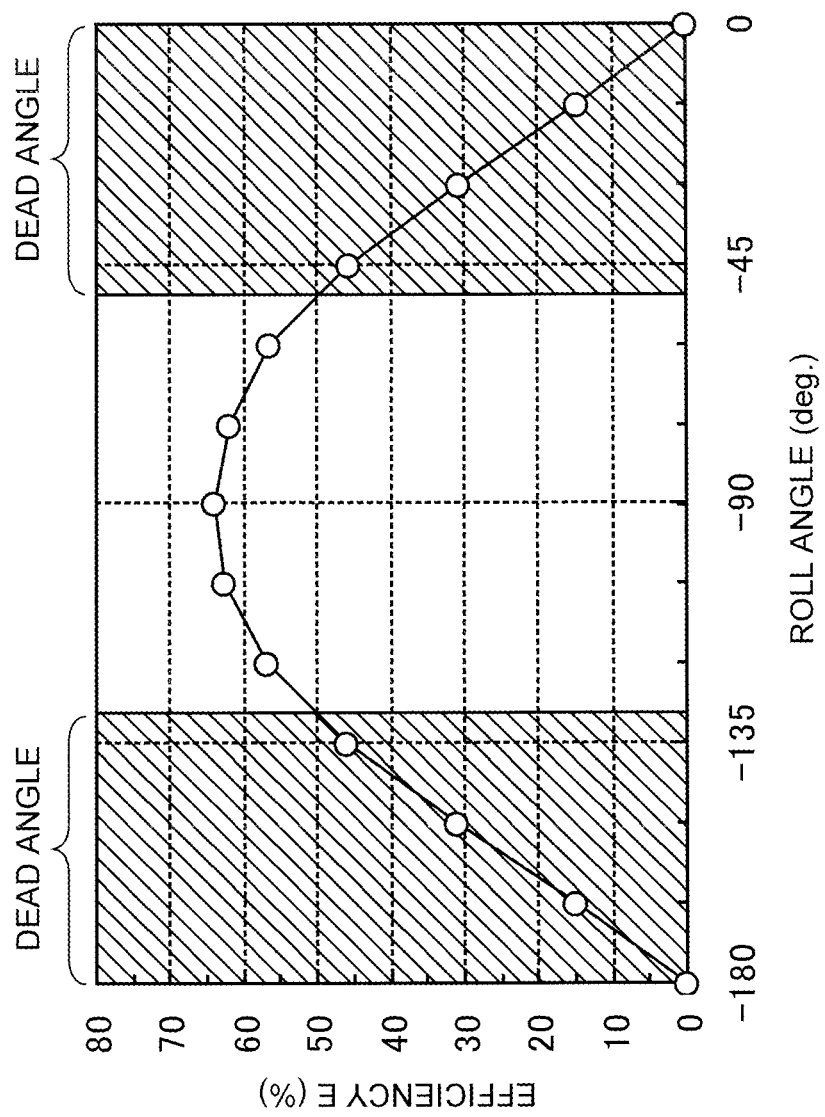
FIG. 10 is a graph obtained by simulating a relation between a roll angle of the rechargeable battery and power transfer efficiency.

FIG. 10 is a graph obtained by simulating a relation between the roll angle θ of the rechargeable battery 15 illustrated in FIG. 8 and FIG. 9 and the power transfer efficiency E.

As illustrated in FIG. 10, when the roll angle θ is equal to −90°, a high efficiency E of about 60% may be achieved since it is possible to prevent the induced currents from cancelling each other as described above. However, when the roll angle θ is equal to 0°, the efficiency E declines to 0% due to the induced currents which cancel each other.

Moreover, the roll angle θ capable of achieving the efficiency E of practical use, which is equal to or above 50%, is limited to a range between ±40° with −90° as a median, and it is not possible to achieve the efficiency E of practical use by setting a roll angle θ outside the aforementioned range. In the following description, a roll angle θ which achieves the efficiency E below 50% will be referred to as a dead angle.

If there is such a wide range of the dead angle as illustrated in FIG. 10, the roll angle θ of the rechargeable battery 15 is more likely to fall within the range of the dead angle when the rechargeable battery 15 is laid in the horizontal plane. As a consequence, there is a risk of a failure to adequately charge the rechargeable battery 15.

Furthermore, when the roll angle θ falls within the range of the dead angle and the efficiency E is reduced, the power not transmitted to the power receiving coil 13 is consumed as Jule heat in the power transmitting coil 11. Accordingly, there is also a safety problem due to heat generation of the power transmitting coil 11.

Now, descriptions will be provided below for embodiments which may reduce the above-described range of the dead angle when a rechargeable battery is charged in accordance with the magnetic field resonance mode.

First Embodiment

Figure 11:
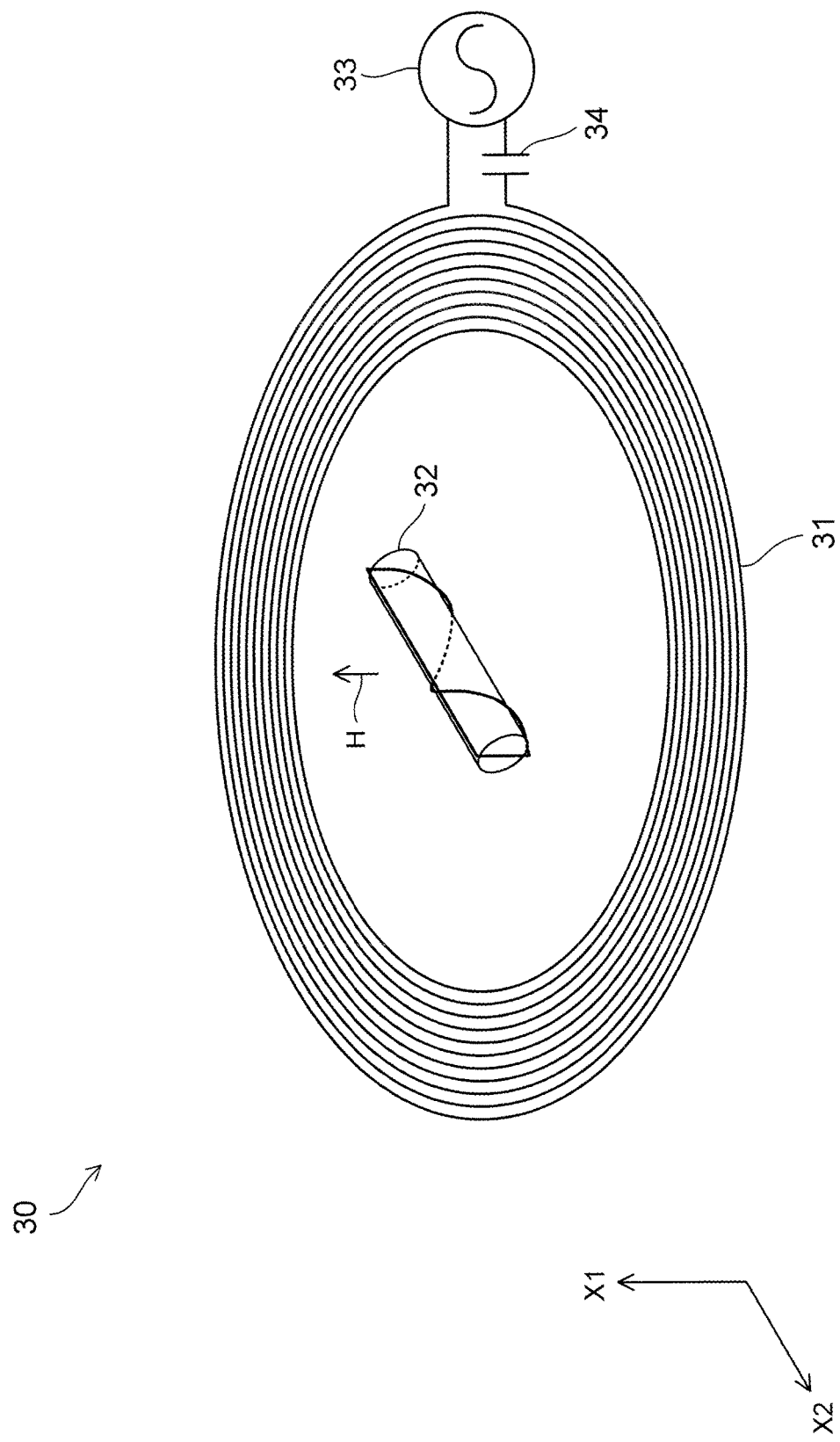
FIG. 11 is a perspective view of a charging system adopting a magnetic field resonance mode according to a first embodiment.

FIG. 11 is a perspective view of a charging system adopting the magnetic field resonance mode according to this embodiment.

A charging system 30 according to this embodiment includes a power transmitting coil 31 and a rechargeable battery 32. The power transmitting coil is wound several times around a first axis X1 oriented in a vertical direction, and is configured to generate a magnetic field H parallel to the first axis X1 by an electric current supplied from an alternating-current power supply 33. Note that a first capacitor configured to form an LC resonance circuit in conjunction with the power transmitting coil 31 is provided between the power transmitting coil 31 and the alternating-current power supply 33.

Here, as for the power transmitting coil 31, a copper wire having fine conductivity may be used as its material, for example.

Meanwhile, the rechargeable battery 32 has a cylindrical shape with its longitudinal direction aligned with a second axis X2. The rechargeable battery 32 is exposed to the above-mentioned magnetic field H. Although the second axis X2 is not particularly limited, the second axis X2 is provided in a horizontal plane in the following description, thereby establishing a state of laying the cylindrical rechargeable battery 32 in the horizontal plane.

Figure 12:
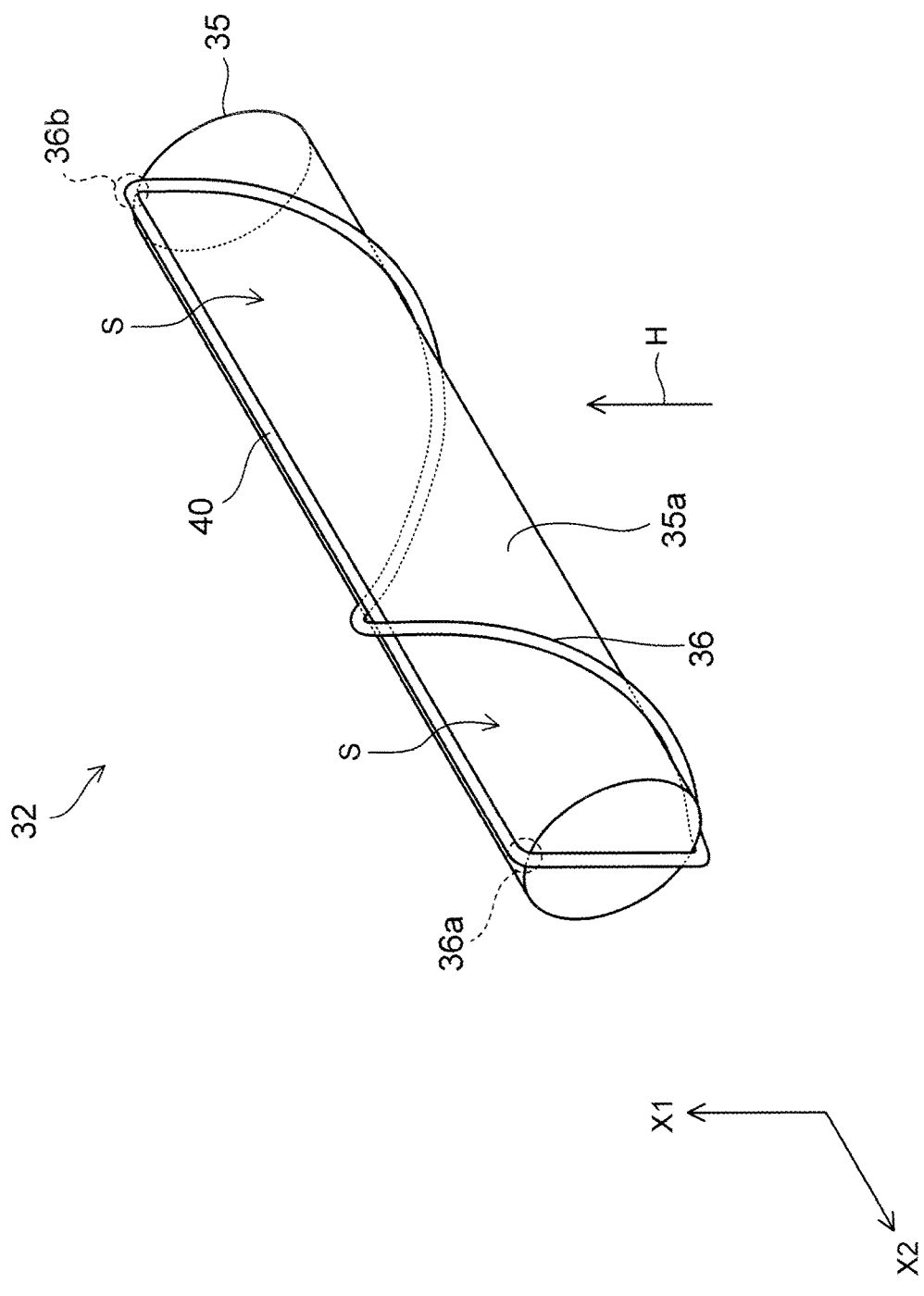
FIG. 12 is a perspective view of a rechargeable battery according to the first embodiment.

FIG. 12 is a perspective view of the rechargeable battery 32.

The rechargeable battery 32 includes a battery body 35 and a power receiving coil 36. The battery body 35 includes a cylindrical outer peripheral side surface 35a, and the power receiving coil 36 is helically wound around the outer peripheral side surface 35a.

The power receiving coil 36 is made of a copper wire, for example, and includes a first end portion 36a and a second end portion 36b. Moreover, a straight conducting wire 40 extending in the longitudinal direction of the battery body 35 and electrically connecting the first end portion 36a and the second end portion 36b to each other is provided between the end portions 36a and 36b.

In the meantime, unlike the power receiving coil 3 used in the electromagnetic induction mode of FIG. 1, the power receiving coil 36 according to this embodiment is loosely wound around the battery body 35. Thus, a space S from which the battery body 35 is largely exposed is provided between adjacent tracks of the power receiving coil 36.

Note that the power receiving coil 36 is illustrated in a continuous shape without any cutouts in FIG. 12 in order to facilitate understanding of the form of the power receiving coil 36. However, in reality, the power receiving coil 36 is cut out in the middle, and cut-out points of the power receiving coil 36 are electrically connected to a positive electrode and a negative electrode of the battery body 35, respectively.

The power receiving coil 36 generates an electromotive force by being exposed to the magnetic field H, and the battery body 35 is charged by the electromotive force.

Figure 13:
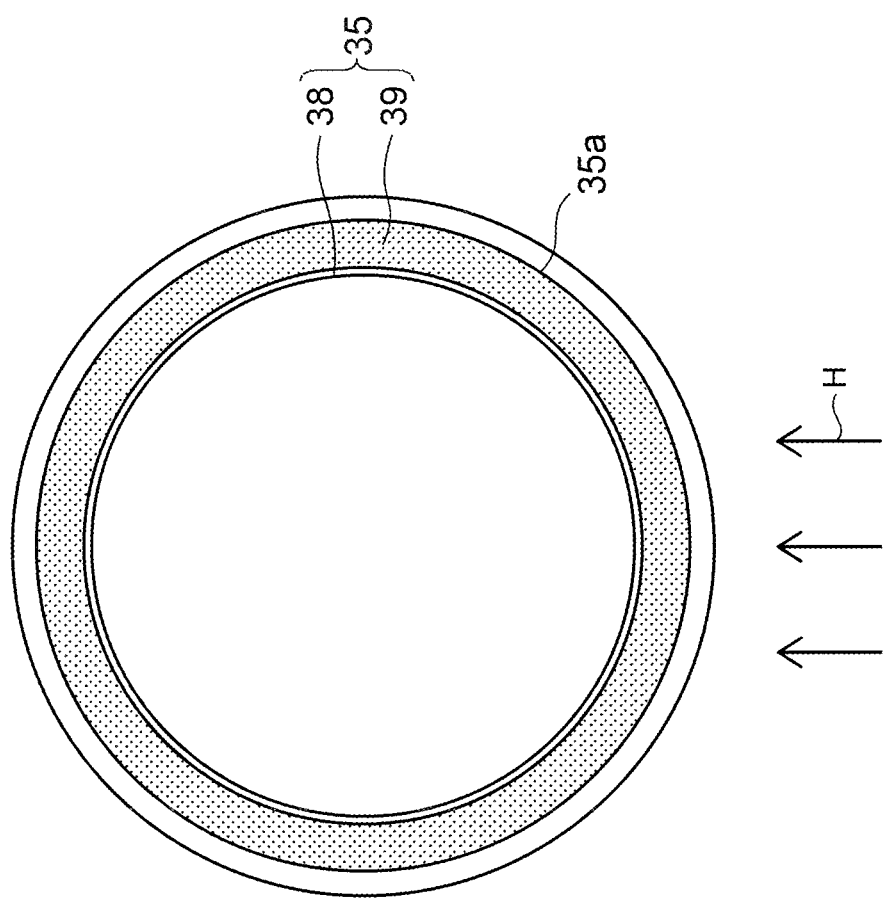
FIG. 13 is a side view of the rechargeable battery according to the first embodiment which is viewed from a direction parallel to a second axis.

FIG. 13 is a side view of the rechargeable battery 32 which is viewed in a direction parallel to the second axis X2 (see FIG. 12).

As illustrated in FIG. 13, the battery body 35 includes a cylindrical tube 38 made of metal, and a magnetic sheet 39 surrounding the tube 38. A surface of the magnetic sheet 39 is defined as the outer peripheral side surface 35a of the battery body 35.

Although the material of the magnetic sheet 39 is not limited to a particular substance, ferrite or a soft magnetic material is used as the material of the magnetic sheet 39 in this example.

The magnetic sheet 39 takes the magnetic field H into to the inside, thereby preventing the magnetic field H from reaching the tube 38. Thus, it is possible to suppress generation of an eddy current on a surface of the tube 38 made of metal due to the magnetic field H, and to suppress wasteful consumption of energy of the magnetic field H to generate the eddy current.

Figure 14:
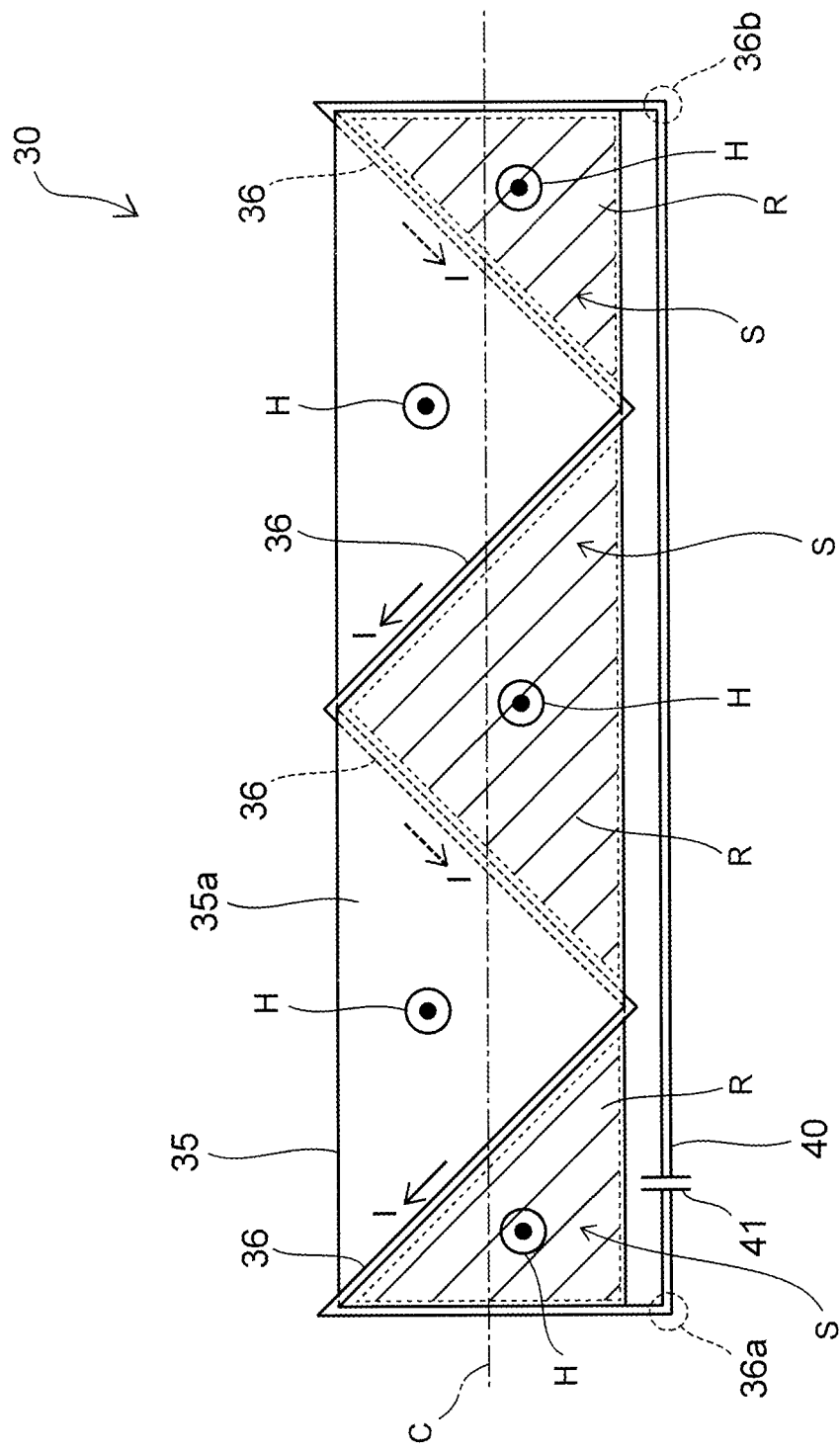
FIG. 14 is another side view of the rechargeable battery according to the first embodiment.

FIG. 14 is a side view of the rechargeable battery 32.

As illustrated in FIG. 14, a second capacitor configured to form an LC resonance circuit in conjunction with the power receiving coil 36 is provided in the middle of the conducting wire 40.

Next, induced currents to be generated in the power receiving coil 36 will be described with reference to FIG. 14.

The battery body 35 is cylindrical as described above. Accordingly, when the battery body 35 is turned around its center axis C, part of the power receiving coil 36 and the conducting wire 40 are hidden behind the battery body 35.

The specific portion of the power receiving coil 36 to be hidden behind varies with the roll angle. Nonetheless, at any roll angle, closed regions R are formed by the power receiving coil 36 and the conducting wire 40 when the battery body 35 is seen through.

A portion of the magnetic field H penetrating each closed region R is provided as an interlinkage magnetic flux penetrating the inside of the power receiving coil 36, and generates an induced current I in the power receiving coil 36. On the other hand, a portion of the magnetic field H passing the outside of the closed regions R does not contribute to the interlinkage magnetic flux penetrating the power receiving coil 36, and therefore generates no induced current I in the power receiving coil 36.

As described above, in this embodiment, the closed regions R to allow penetration of the interlinkage magnetic flux are formed by helically winding the power receiving coil 36 around the battery body 35, and the induced current I flows along an outline of each closed region R.

In order to obtain the induced current I sufficiently large for charging the battery body 35 in the magnetic field resonance mode, it is preferable to form the closed regions R as large as possible so as to increase the portion of the interlinkage magnetic flux penetrating each closed region R. For this reason, this example provides the space S, from which the outer peripheral side surface 35a of the battery body 35 is exposed, by winding the power receiving coil 36 as loosely as possible, thereby increasing the area of each closed region R in a side view.

Next, a dead angle of the rechargeable battery 32 according to this embodiment will be described.

As described above, the dead angle is defined as the roll angle θ at which the efficiency E of the power transferred between the power transmitting coil 31 and the power receiving coil 36 falls below 50%.

Figure 15:
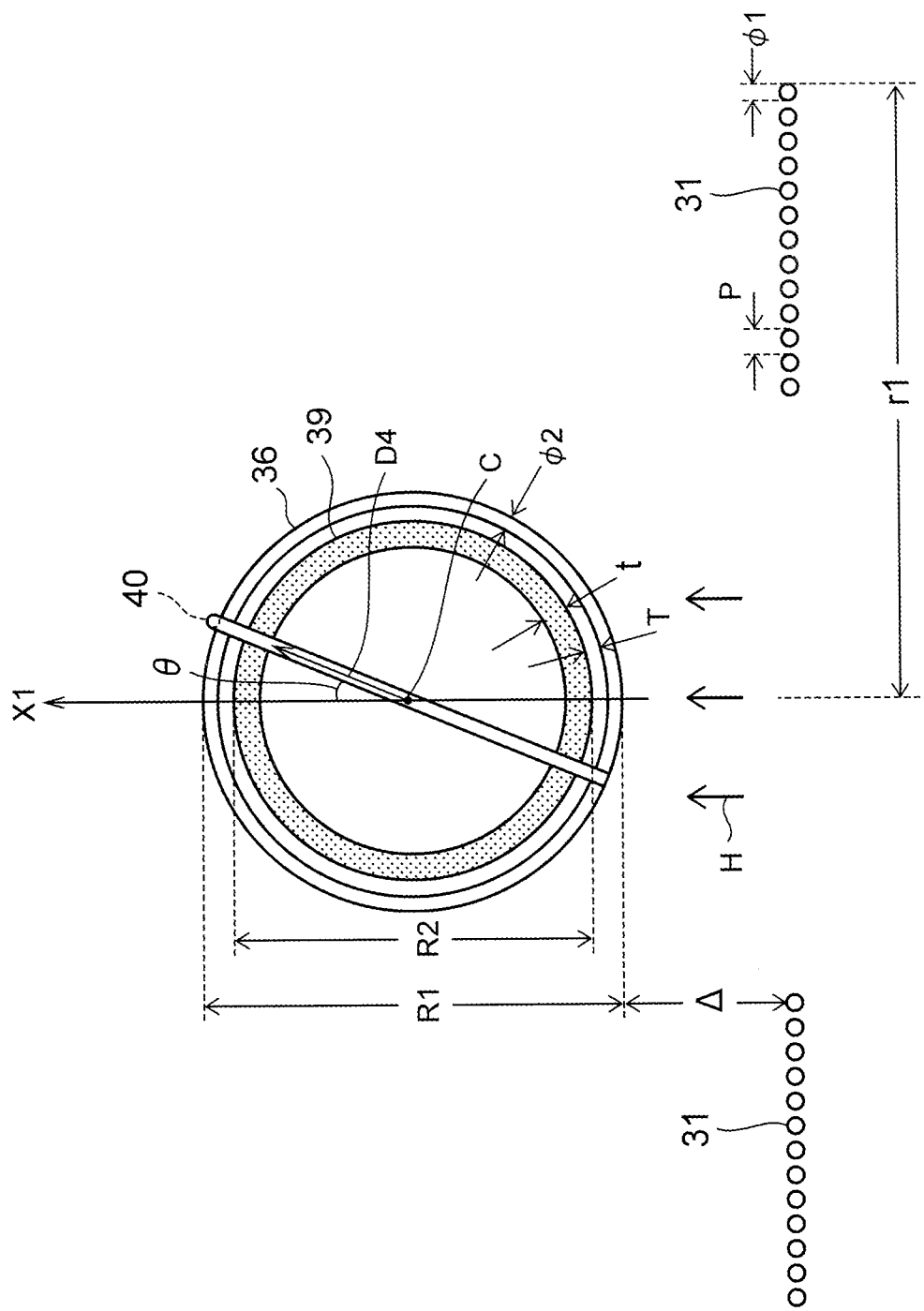
FIG. 15 is a side view for explaining a roll angle in the first embodiment.

FIG. 15 is a side view for explaining the roll angle θ.

In this example, the roll angle θ is an angle between a direction D4 from the center axis C toward the conducting wire 40 and the first axis X1 directed vertically upward in a side view. Here, a counterclockwise direction around the center axis C is defined as a positive direction.

The inventor of the present application obtains a relation between the roll angle θ and the efficiency E by means of a simulation applying conditions set out in FIG. 16.

Figure 17:
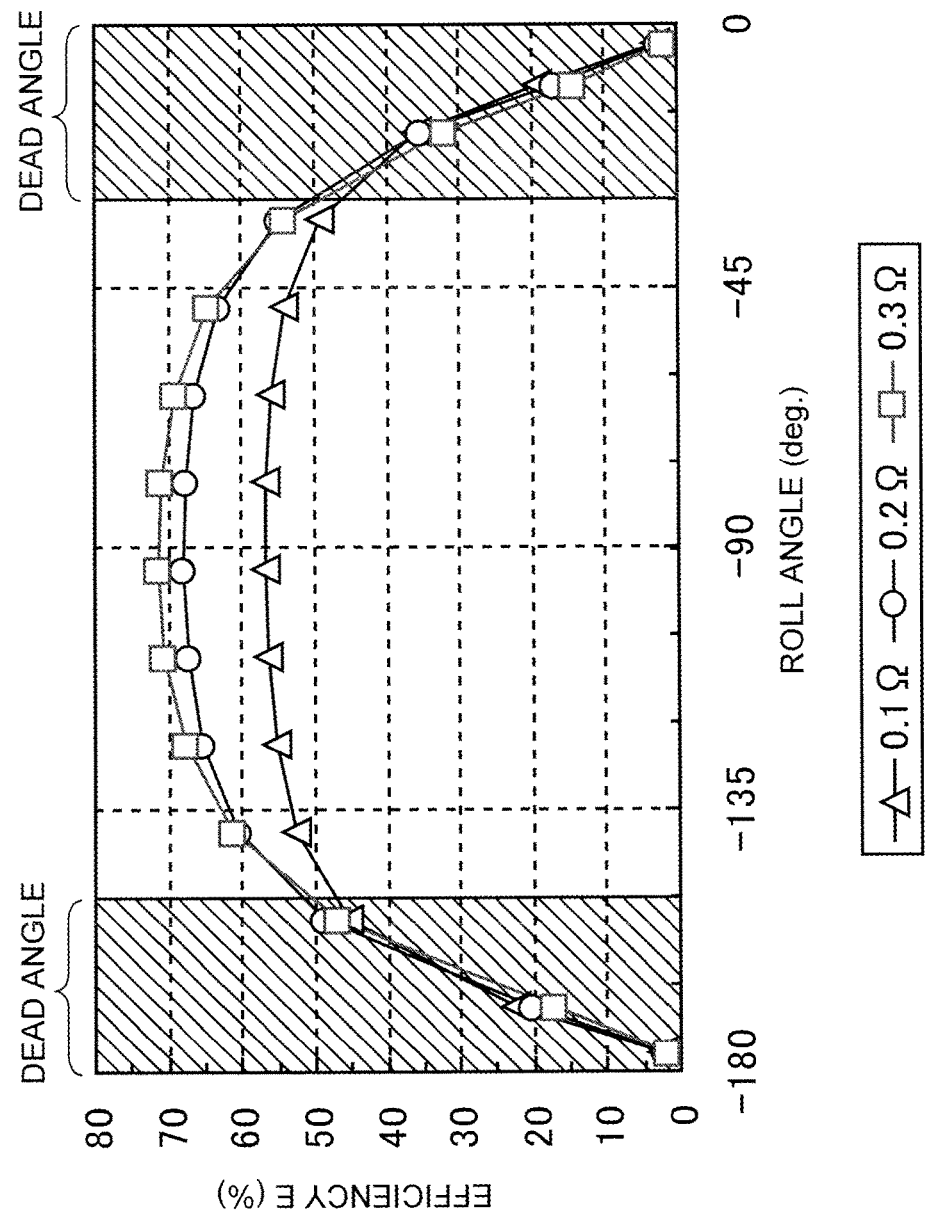
FIG. 17 is a graph obtained by simulating a relation between a roll angle of the rechargeable battery according to the first embodiment and its efficiency.

A result of the simulation is illustrated in FIG. 17.

In this simulation, a load resistor to simulate internal resistance of the rechargeable battery 32 is connected in series to the power receiving coil 36, and calculation is performed for each case of the load resistors having resistances of 0.1Ω, 0.2Ω, and 0.3Ω.

As illustrated in FIG. 17, the dead angle of the roll angle θ where the efficiency E falls below 50% is limited to a range from −180° to 150° and a range from −30° to 0°. On the other hand, an angular range where the roll angle θ does not fall into the dead angle is as wide as 120°.

Figure 18:
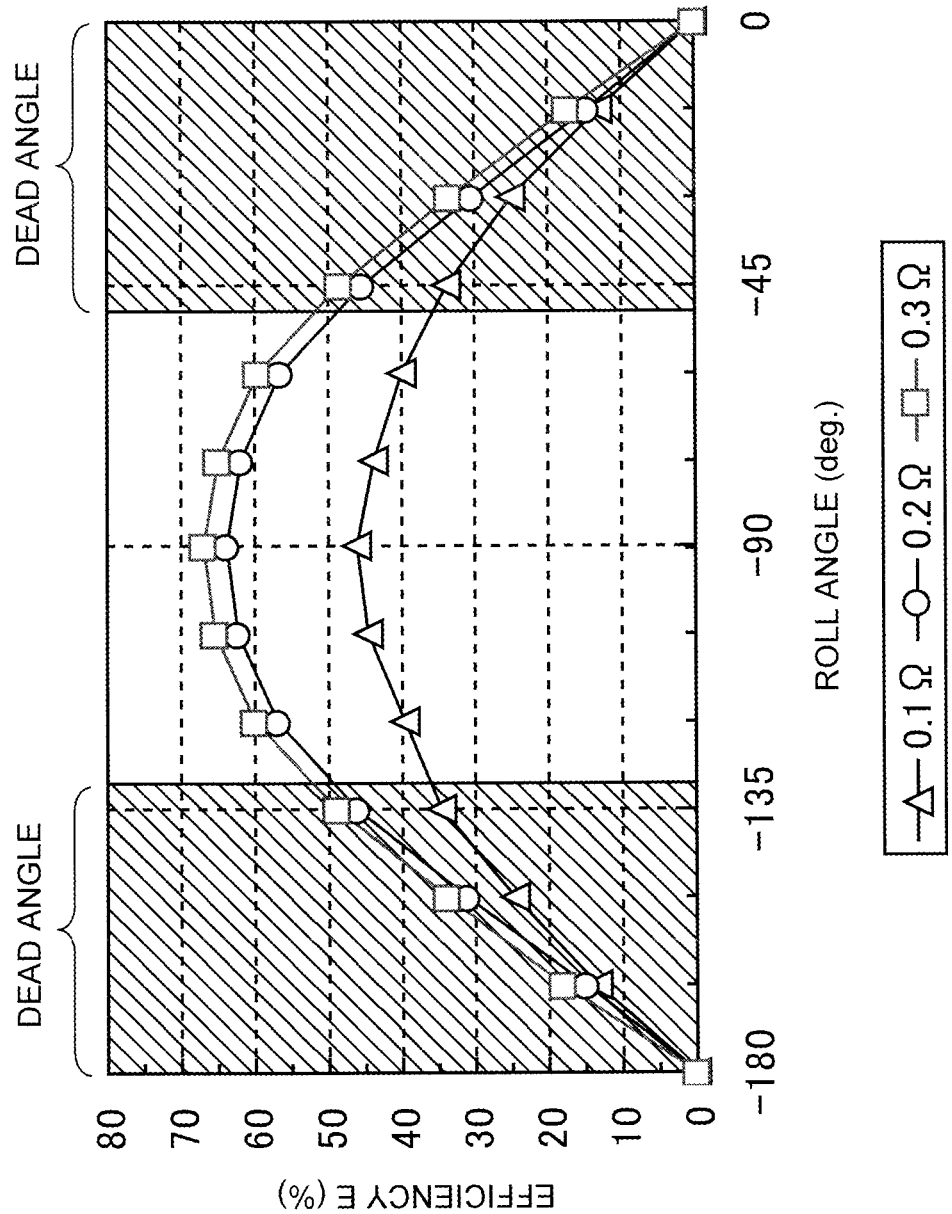
FIG. 18 is a graph obtained by simulating a relation between a roll angle of a rechargeable battery according to a comparative example and its efficiency.

Meanwhile, FIG. 18 is a graph illustrating a result obtained by conducting the same simulation as that of FIG. 17 regarding a comparative example which uses the power receiving coil 13 having the rectangular unwound shape as in FIG. 4.

In the comparative example, a diameter of the battery body 35 is set to 10 mm and a diameter of a cross section of the power receiving coil 13 is set to 0.5 mm. Meanwhile, capacitance of the second capacitor 17 (see FIG. 4) connected to the power receiving coil 13 is set to 3470 pF.

As illustrated in FIG. 18, in the comparative example, an angular range where the roll angle θ does not fall into the dead angle is limited to a range as wide as 80°. Accordingly, the range of the dead angle becomes wider than that of the embodiment illustrated in FIG. 17.

From these results, the provision of the space between the tracks of the power receiving coil 36 so as to allow exposure of the surface of the battery body 35 therefrom by helically winding the power receiving coil 36 as described above turns out to be effective in reducing the angular range of the dead angle.

The reduction in the range of the dead angle as described above is thought to be due to the fact that, even when the battery body 35 is turned around the center axis C, the closed regions R (see FIG. 14) to allow penetration of the interlinkage magnetic flux are formed in the space of the power receiving coil 36 in the side view.

Since the range of dead angle is reduced as described above, the roll angle θ is less likely to fall into the range of the dead angle when a user rolls the rechargeable battery 32 on the horizontal plane. This makes it possible to increase flexibility of a positional relation between the power transmitting coil 31 and the power receiving coil 36 in order to improve the power transfer efficiency from the power transmitting coil 31 to the power receiving coil 36, and thus to contribute to convenience for the user.

Next, various studies conducted by the inventor of the present application will be described.

First, a preferable number of turns of the power receiving coil 36 will be discussed.

The number of turns of the power receiving coil 36 is not particularly limited. However, resistance $R_{ohm}$ of the power receiving coil 36 is increased if the number of turns is large. Hence, the induced current I induced in the power receiving coil is reduced and the efficiency E of the power transferred between the power transmitting coil 31 and the power receiving coil 36 declines as a consequence.

Meanwhile, as indicated earlier with Formula (1), the Q factor declines when the resistance $R_{ohm}$ of the power receiving coil 36 is increased. Since the efficiency E is also reduced due to the decline in the Q factor, it is thought to be preferable to set the resistance $R_{ohm}$ smaller by reducing the number of turns of the power receiving coil 36 as much as possible in order to avoid the reduction in the efficiency E due to the decline in the factor Q.

Figure 19:
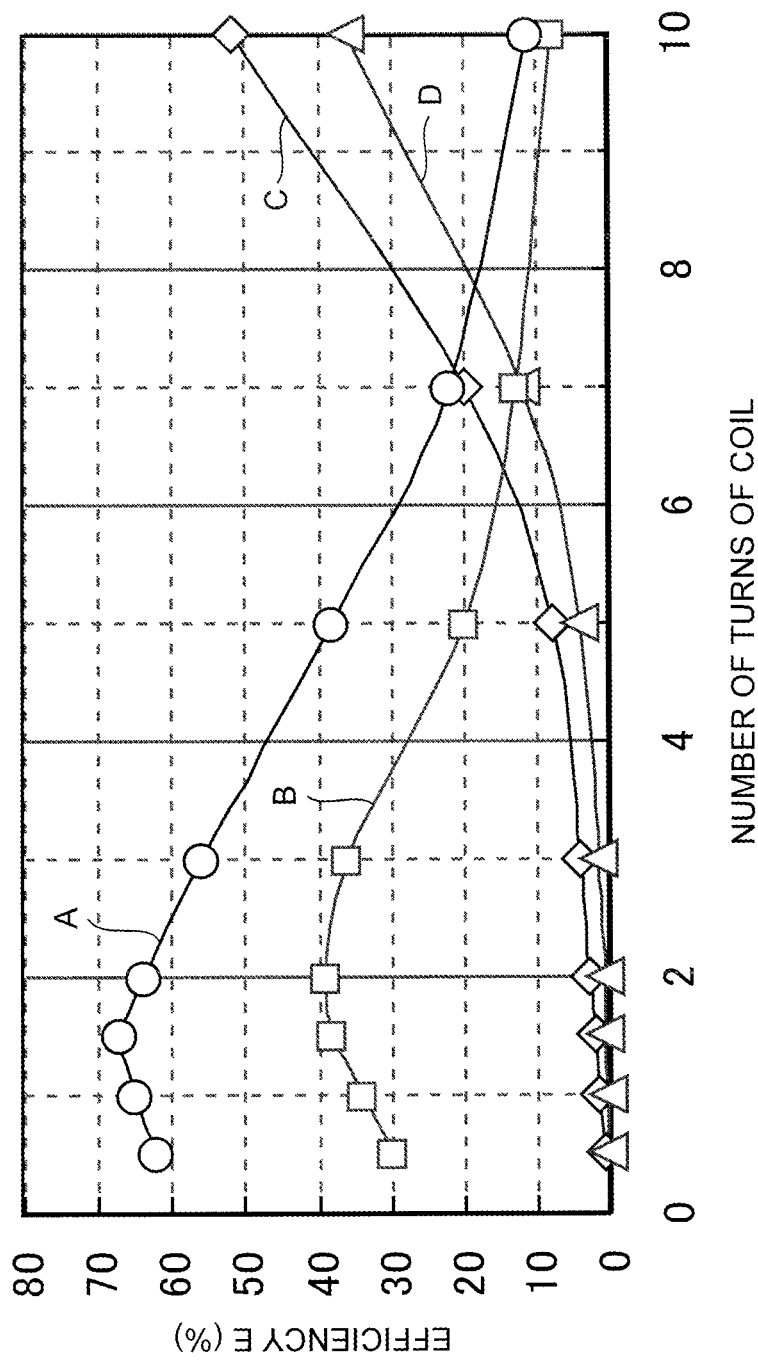
FIG. 19 is a graph obtained by conducting a study simulating a relation between the number of turns of a power receiving coil and its efficiency in the first embodiment.

FIG. 19 is a graph obtained by conducting a study simulating a relation between the number of turns of the power receiving coil 36 and efficiency E.

In the study, in addition to graphs A and B concerning the power receiving coil 36 for the magnetic field resonance mode, graphs C and D concerning a coil for the electromagnetic induction mode are also acquired for the purpose of comparison.

Although the power receiving coil 36 for the magnetic field resonance mode is provided with the second capacitor 41 (see FIG. 14) as described above, the coil for the electromagnetic induction mode is not provided with a capacitor in this simulation.

In the meantime, the graphs A and D are graphs each obtained when the longitudinal direction of the battery body 35 is aligned parallel to a coil face of the power transmitting coil 31. On the other hand, the graphs B and C are graphs each obtained when the longitudinal direction of the battery body 35 is aligned perpendicular to the coil face of the power transmitting coil 31.

Furthermore, on the acquisition of the graphs A to D, the simulation is conducted while connecting a load resistor, having a resistance of 0.2Ω to simulate internal resistance of the rechargeable battery, in series to each of the corresponding coils.

According to the graph A representing this embodiment, the highest efficiency is achieved when the number of turns is equal to 1.5.

Moreover, as indicated in the graph A, the efficiency declines when the number of turns becomes less than 1.5. This is thought to be due to the following reason. Specifically, when the number of turns is reduced, the resistance $R_{ohm}$ of the power receiving coil 36 is reduced as compared to the case where the number of turns is equal to 1.5. Instead, the total area of the closed regions R runs short whereby the interlinkage magnetic flux is decreased and the efficiency E declines as a consequence.

Meanwhile, in the graph A, the efficiency also declines when the number of turns is more than 1.5. This is thought to be because the aforementioned Q factor declines due to the increase in the resistance $R_{ohm}$.

Thus, the simulation makes clear that it is most preferable to set the number of turns of the power receiving coil 36 equal to 1.5 so that the efficiency E may be maintained at a high value.

As indicated with each of the graphs C and D, the simulation also makes clear that the efficiency at a low value close to 0% is available from the coil for the electromagnetic induction mode without the capacitor when the number of turns of the coil is set to 1.5.

Next, a preferable number of layers of the power receiving coil 36 will be discussed.

When the power receiving coil 36 is wound in two or more layers, the resistance $R_{ohm}$ of the power receiving coil 36 is increased as with the case of increasing the number of turns. As a consequence, the efficiency E and the Q factor decline as described above.

Accordingly, in light of maintaining the efficiency E and the Q factor at high values, it is preferable to wind the power receiving coil in at most a single layer.

Next, the way of winding the power receiving coil 36 will be discussed.

Figure 20A:
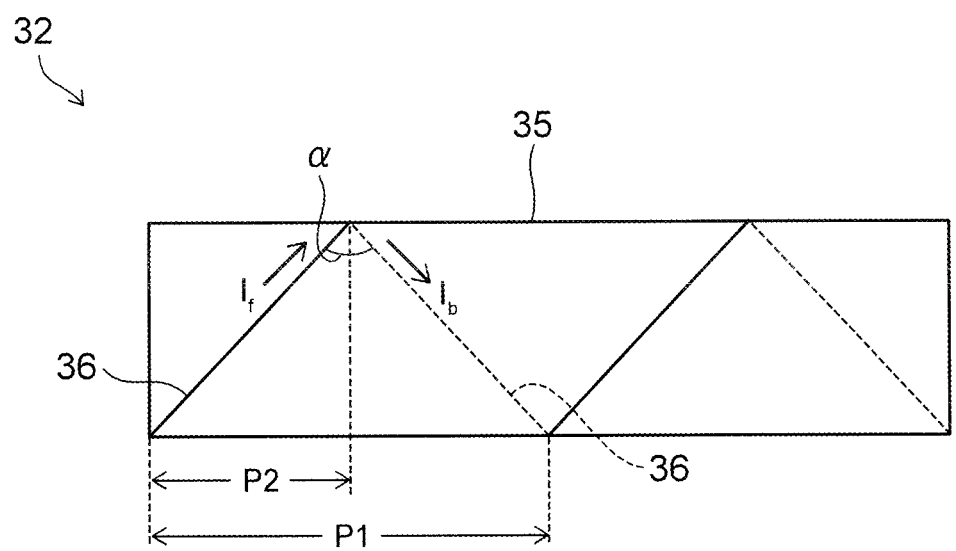
FIG. 20A is a side view of the rechargeable battery according to the first embodiment and FIG. 20B is a side view of a rechargeable battery according to a comparative example.

FIG. 20A is a side view of the rechargeable battery 32 according to this embodiment.

As illustrated in FIG. 20A, in this embodiment, a first pitch P1 corresponding to one round of the power receiving coil 36 is greater than a second pitch P2 corresponding to a half round of the power receiving coil 36. In this way, it is possible to increase an angle α between an induced current $I_f$ flowing in a visible portion of the power receiving coil 36 not hidden behind the battery body 35 and an induced current $I_b$ flowing in another portion of the power receiving coil 36 hidden behind the battery body 35. As a consequence, directions of the induced currents $I_f$ and $I_b$ are less likely to become antiparallel to each other, and it is possible to inhibit the induced currents $I_f$ and $I_b$ from cancelling each other and thus to induce a large induced current in the power receiving coil 36.

Figure 20B:
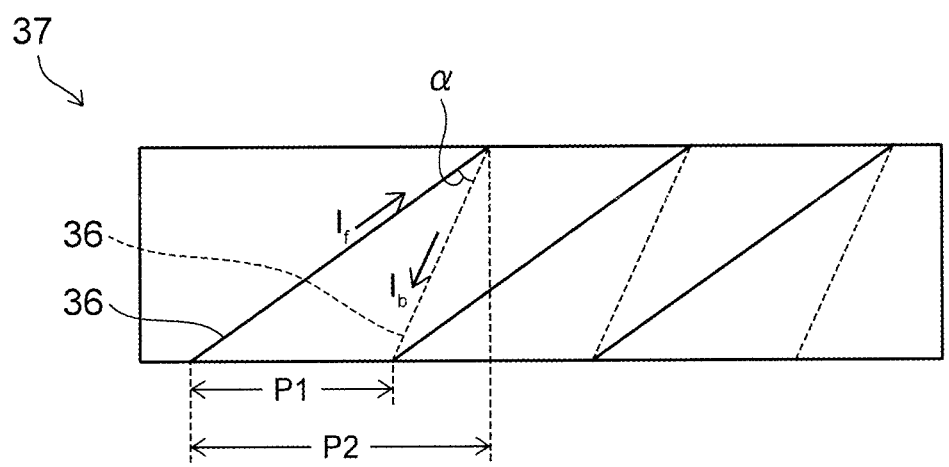

On the other hand, FIG. 20B is a side view of a rechargeable battery 37 according to a comparative example.

In this comparative example, the power receiving coil 36 is helically wound around the battery body 35 as with the embodiment.

It is to be noted, however, that the first pitch P1 corresponding to one round of the power receiving coil 36 is set equal to or below the second pitch P2 corresponding to a half round of the power receiving coil 36.

In this way, the above-described angle α between the induced current $I_f$ and the induced current $I_b$ becomes smaller than that of the embodiment. Accordingly, the directions of the induced currents $I_f$ and $I_b$ become closer to an antiparallel state. Hence, the induced currents $I_f$ and $I_b$ partially cancel each other and the total induced current flowing in the power receiving coil 36 is reduced as a consequence.

As described above, in light of inducing a large induced current in the power receiving coil 36, it is preferable to set the first pitch P1 greater than the second pitch P2.

Next, a preferable aspect ratio of battery body 35 will be discussed.

The aspect ratio is defined as L/R, in which L is a length in the longitudinal direction of the cylindrical battery body 35 and R is a diameter thereof.

The inventor of the present application studies a relation between the aspect ratio and the above-described efficiency E regarding each of batteries of size D, size C, size AA, and size AAA. Results of the study are set out in Table 1.

TABLE 1

| | Diameter R | Length L | Aspect ratio (L/R) | Efficiency E |
|---|---|---|---|---|
| Size D battery | 31.5 mm | 57.5 mm | 1.83 | 72.20% |
| Size C battery | 24.0 mm | 46.5. mm | 1.94 | 75.50% |
| Size AA battery | 12.5 mm | 48.5 mm | 3.88 | 75.10% |
| Size AAA battery | 9.0 mm | 43.0 mm | 4.78 | 71.60% |

In this study, the number of turns of the power receiving coil 36 is set to 1.5 for each of the batteries of size D, size C, size AA, and size AAA.

As set out in Table 1, the study makes clear that all the batteries of size D, size C, size AA, and size AAA successfully achieves the high efficiency E equal to or above 70%.

Among the batteries of size D, size C, size AA, and size AAA, there is high demand for the batteries of size AA and size AAA in the market. According to Table 1, each of the batteries of size AA and size AAA has an aspect ratio equal to or above 3.5. It is therefore possible to provide rechargeable batteries which may be readily accepted by the market by winding the power receiving coil 36 around the battery body 35 having the aspect ratio equal to or above 3.5.

Second Embodiment

In the first embodiment, as illustrated in FIG. 17, the efficiency E becomes highest when the roll angle θ is equal to −90°. On the other hand, the efficiency E is equal to 0 when the roll angle θ is set to −180° or 0°.

A reason why such a difference in efficiency occurs depending on the roll angle θ will be described with reference to FIGS. 21A and 21B.

Figure 21A:
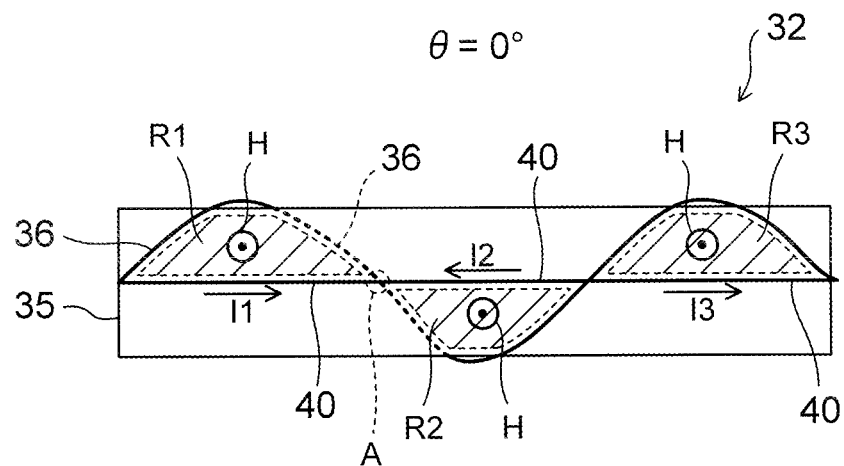
FIGS. 21A and 21B are side views of a rechargeable battery for explaining a reason why a difference in efficiency occurs depending on the roll angle in a second embodiment.

FIG. 21A is a side view of the rechargeable battery 32 viewed in an eye direction parallel to the magnetic field H when the roll angle θ is equal to 0°.

In this case, when the battery body 35 is seen through, there are closed regions R1 to R3 whose outlines are defined by the power receiving coil 36 and the conducting wire 40. In the closed regions R1 to R3, induced currents I1 to I3 attempt to flow in directions of arrows indicated in FIG. 21A, respectively.

However, the directions of the induced currents I1 to I3 flowing in the conducting wire 40 are not the same in all the closed regions R1 to R3. Specifically, the direction of the induced current I2 is different from those of the induced currents I1 and I3. As a consequence, when the roll angle θ is equal to 0°, the currents I1 to I3 cancel one another whereby the efficiency declines to 0.

The above-described difference in direction between the induced current I1 and the induced current I2 is thought to be attributed to crossing of a portion of the power receiving coil 36 hidden behind the battery body 35 and the conducting wire 40, which takes place at a contact point A between the closed regions R1 and R2 where the induced currents I1 and I2 flow, respectively.

Figure 21B:
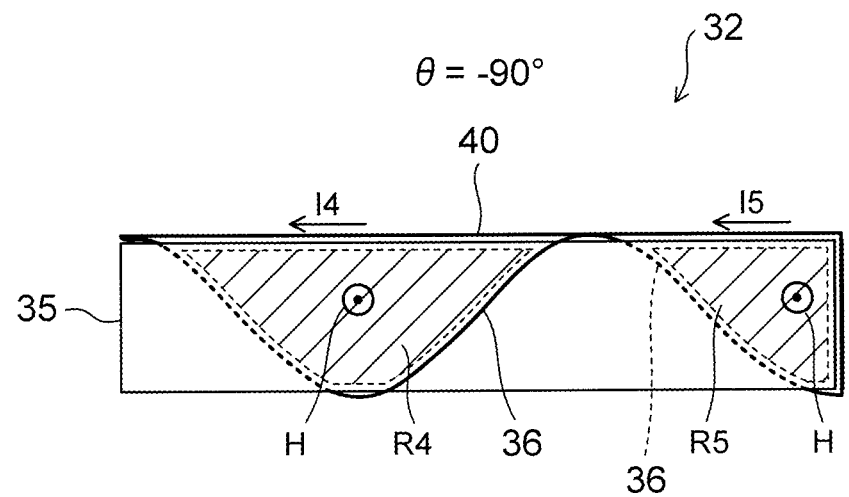

Meanwhile, FIG. 21B is a side view of the rechargeable battery 32 viewed in the eye direction parallel to the magnetic field H when the roll angle θ is equal to −90°.

In this case, when the battery body 35 is seen through, there are closed regions R4 and R5 whose outlines are defined by the power receiving coil 36 and the conducting wire 40. In the closed regions R4 and R5, induced currents I4 and I5 flow in directions of arrows indicated in FIG. 21B, respectively.

Unlike the case of FIG. 21A, when the roll angle θ is equal to −90°, the portion of the power receiving coil 36 hidden behind the battery body 35 and the conducting wire 40 do not cross each other. Accordingly, the induced currents I4 and I5 flow in the same direction. As a consequence, the induced currents I4 and I5 do not cancel each other in this case, and the high efficiency is obtained as illustrated in FIG. 17.

As described above, the reason for causing the difference in efficiency depending on the roll angle θ is attributed to the fact that the above-mentioned contact point A between the portion of the power receiving coil 36 hidden behind the battery body and the conducting wire 40 emerges or does not emerge depending on the eye direction.

An eye direction with which the above-mentioned contact point A does not emerge as illustrated in FIG. 21B will be hereinafter referred to as a first direction $D_0$.

As described below, this embodiment maximizes the efficiency E by utilizing the first direction $D_0$.

Figure 22:
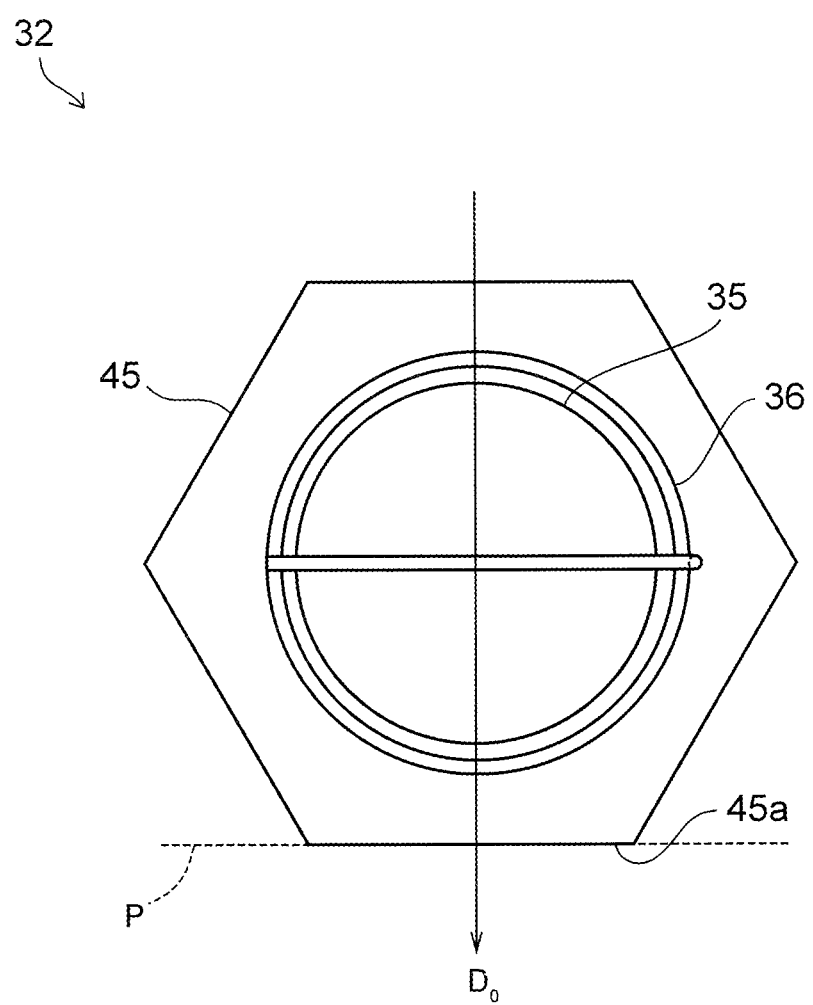
FIG. 22 is a cross-sectional view of a rechargeable battery according to a first example of the second embodiment.

FIG. 22 is a cross-sectional view of a rechargeable battery 32 according to a first example of this embodiment.

This rechargeable battery 32 includes a casing 45 which houses the battery body 35 and the power receiving coil 36 described in the first embodiment. The casing 45 has a polygonal sectional shape, and is provided with a flat surface 45a which is provided orthogonally to the first direction $D_0$.

The attitude of the rechargeable battery 32 is stabilized in the state where the rechargeable battery 32 is disposed on a horizontal plane P with the flat surface 45a put down. Thus, the roll angle θ is set to −90° without the user's attention to the roll angle θ, and the efficiency E is maximized as a consequence.

Figure 23:
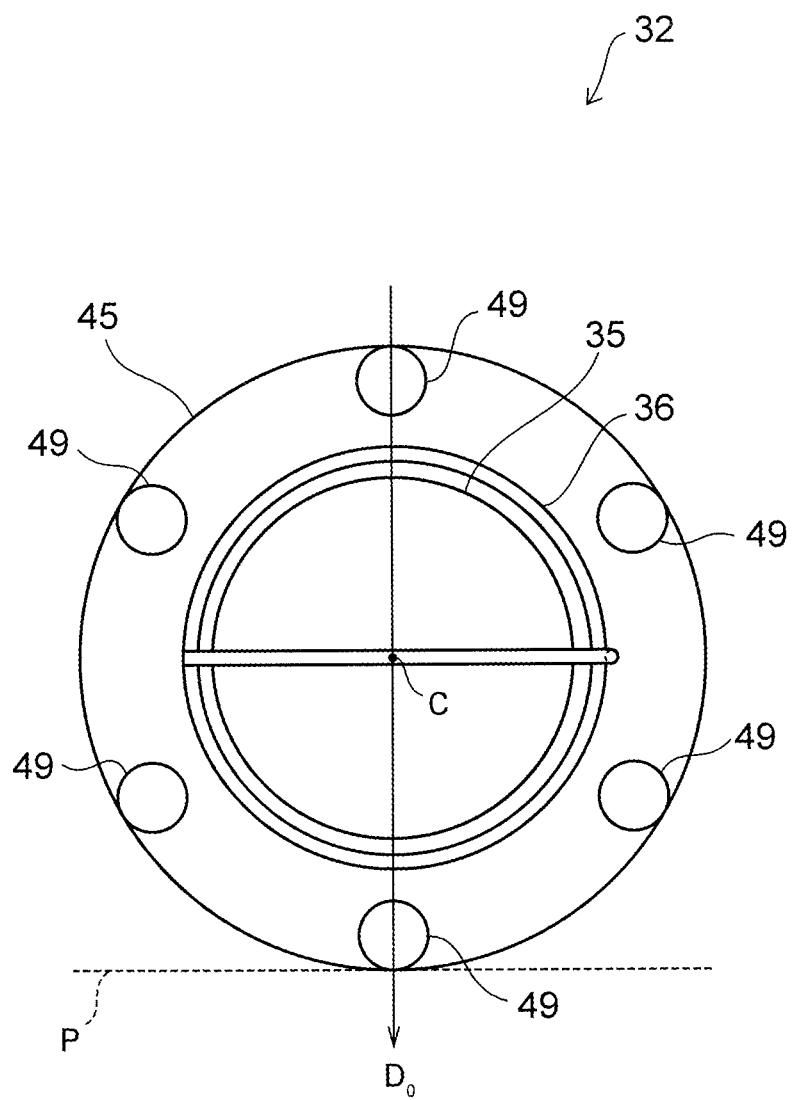
FIG. 23 is a cross-sectional view of a rechargeable battery according to a second example of the second embodiment.

FIG. 23 is a cross-sectional view of a rechargeable battery 32 according to a second example of this embodiment.

As illustrated in FIG. 23, this rechargeable battery 32 includes a casing 45 which houses the battery body 35 and the power receiving coil 36 described in the first embodiment. The casing 45 is cylindrical, and houses a plurality of weights 49 in the inside.

The way of arranging the weights 49 is not limited to a particular layout. In this example, six weights 49 are arranged on an inner surface of the casing 45 in such a way that extension lines from the center axis C of the battery body 35 to every two adjacent weights 49 define an angle of 60°. Moreover, at least one of the six weights 49 is located along the first direction $D_0$.

Thus, when the first direction $D_0$ is oriented vertically downward, a sum of gravitational moments about the center axis C acting on the weights 49 becomes equal to 0. For this reason, the attitude of the rechargeable battery 32 is stabilized in the state where the first direction $D_0$ is oriented vertically downward. Thus, the roll angle θ is set to −90° without the user's attention to the roll angle θ, and the efficiency E may be maximized as a consequence.

Figure 24:
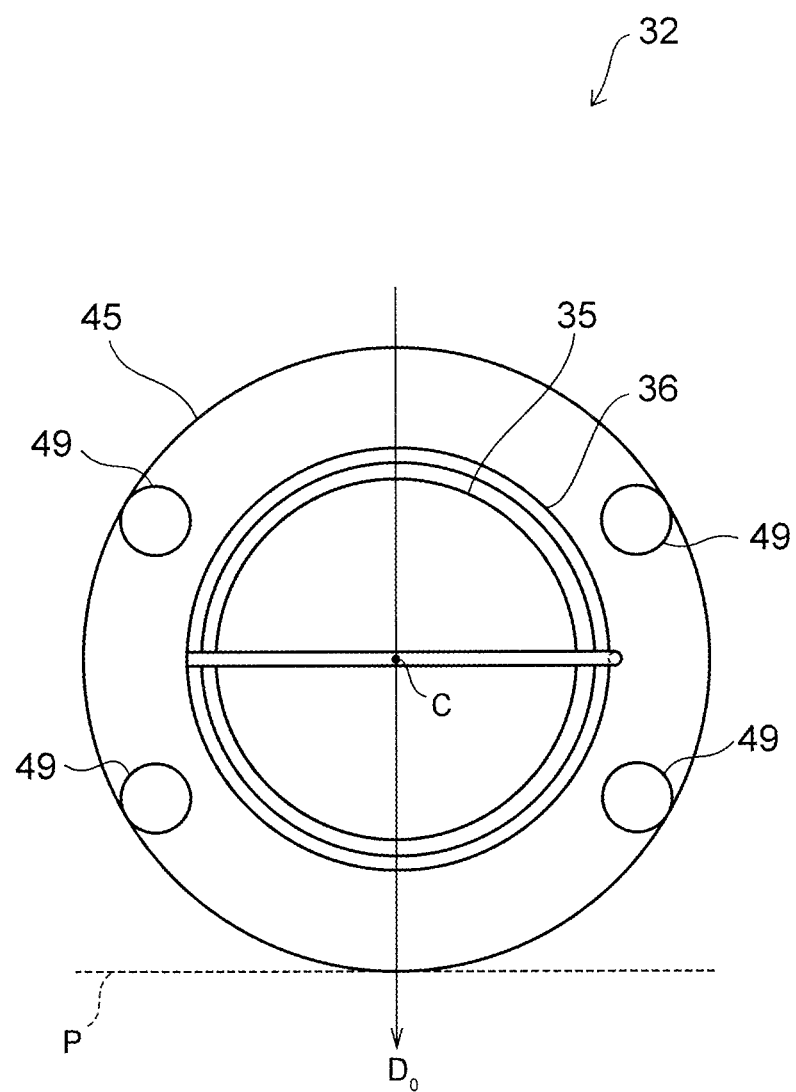
FIG. 24 is a cross-sectional view of a rechargeable battery according to a third example of the second embodiment.

FIG. 24 is a cross-sectional view of a rechargeable battery 32 according to a third example of this embodiment.

The rechargeable battery 32 is provided with a plurality of weights 49 also in this example as with the second example illustrated in FIG. 23. However, in this example, the weights 49 are arranged in such a way that the sum of gravitational moments acting on the weights 49 becomes equal to 0 when the first direction $D_0$ is oriented vertically downward, while locating no weights 49 on the line of the first direction $D_0$.

In this way, the attitude of the rechargeable battery 32 is stabilized in the state where the first direction $D_0$ is oriented vertically downward, due to the same reason as that in the second example. Thus, the efficiency E is maximized as a consequence.

Figure 25:
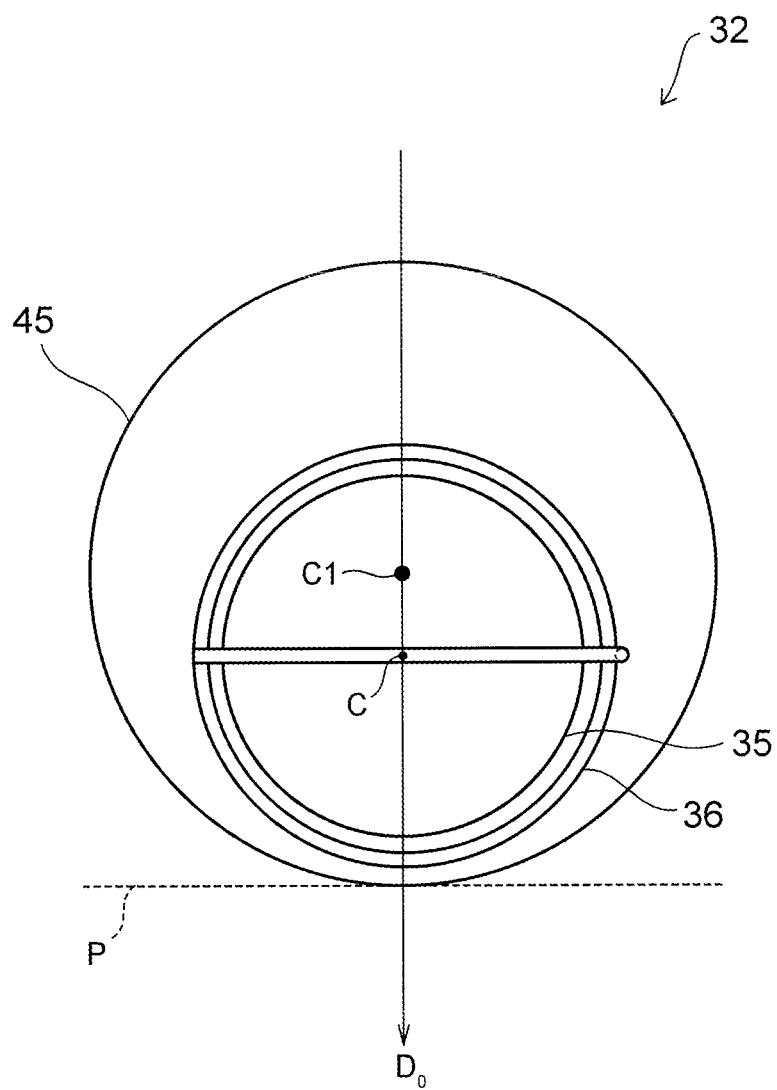
FIG. 25 is a cross-sectional view of a rechargeable battery according to a fourth example of the second embodiment.

FIG. 25 is a cross-sectional view of a rechargeable battery 32 according to a fourth example of this embodiment.

This rechargeable battery 32 includes a cylindrical casing 45 which houses the battery body 35 and the power receiving coil 36 described in the first embodiment.

In this example, the center axis C of the battery body 35 is displaced from a center axis C1 of the casing 45 to the first direction $D_0$.

Thus, the center of gravity of the rechargeable battery 32 is displaced to the first direction $D_0$. Accordingly, when the rechargeable battery 32 is placed on the horizontal plane P, the attitude of the rechargeable battery 32 is stabilized in the state where the first direction $D_0$ is oriented vertically downward. Thus, the roll angle θ is automatically set to −90° without the user's attention to the roll angle θ, and the efficiency E may be maximized as a consequence.

Each of the above-described examples illustrated in FIG. 22 to FIG. 25 explains the rechargeable battery 32. Meanwhile, as described below, these examples are also applicable to electronic devices including a smartphone, a tablet PC (personal computer), a TV remote control, a home-use game console, and the like.

FIG. 26 to FIG. 29 are cross-sectional views of electronic devices of this embodiment.

Figure 26:
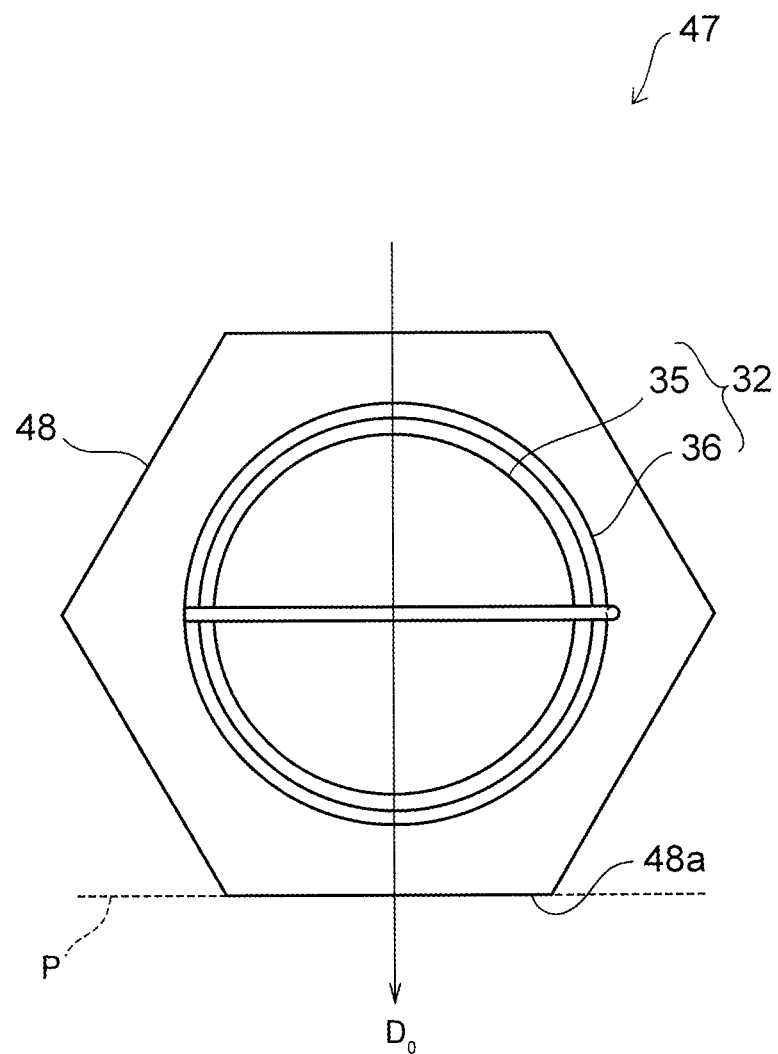
FIG. 26 is a cross-sectional view of an electronic device according to the first example of the second embodiment.

FIG. 26 is a cross-sectional view of an electronic device 47 according to the first example of this embodiment.

This electronic device 47 includes a housing which houses the rechargeable battery 32 of the first embodiment.

As with the casing 45 of FIG. 22, the housing 48 has a polygonal sectional shape, and is provided with a flat surface 48a which is provided orthogonally to the first direction $D_0$.

Accordingly, the attitude of the electronic device 47 is stabilized when the roll angle θ is equal to −90° due to the same reason described with reference to FIG. 22, and the efficiency E of the rechargeable battery 32 is maximized as a consequence.

Figure 27:
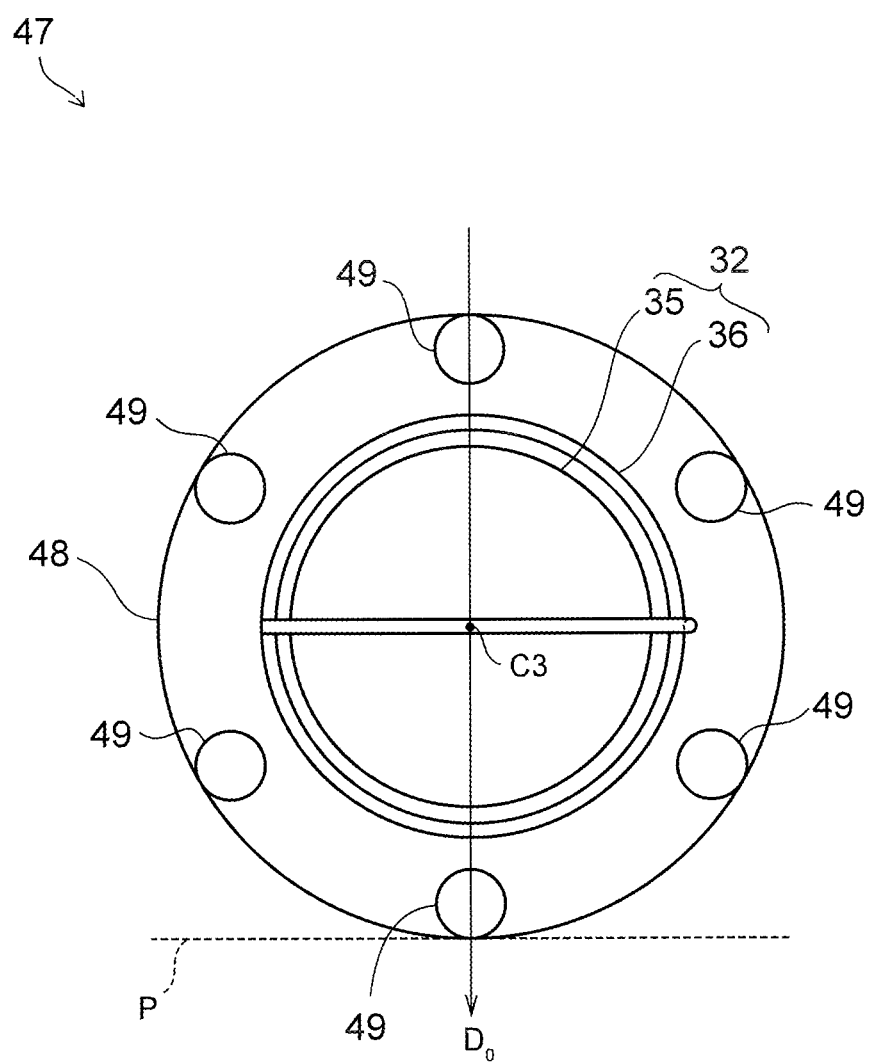
FIG. 27 is a cross-sectional view of an electronic device according to the second example of the second embodiment.

FIG. 27 is a cross-sectional view of an electronic device 47 according to the second example of this embodiment.

This electronic device 47 includes a cylindrical housing 48 which houses the rechargeable battery 32 of the first embodiment, and is provided a plurality of weights 49 inside the housing 48.

The weights 49 are arranged in a similar manner to the example of FIG. 23, and the sum of gravitational moments acting on the weights 49 becomes equal to 0 when a center axis C3 of the cylindrical housing 48 is taken as a reference axis. For this reason, as described with reference to FIG. 23, in this electronic device 47 as well, the attitude of the rechargeable battery 32 is stabilized in the state where the first direction $D_0$ is oriented vertically downward. For this reason, the roll angle θ of the rechargeable battery 32 is set to −90° without the user's attention to the roll angle θ, and the efficiency E may be maximized as a consequence.

Figure 28:
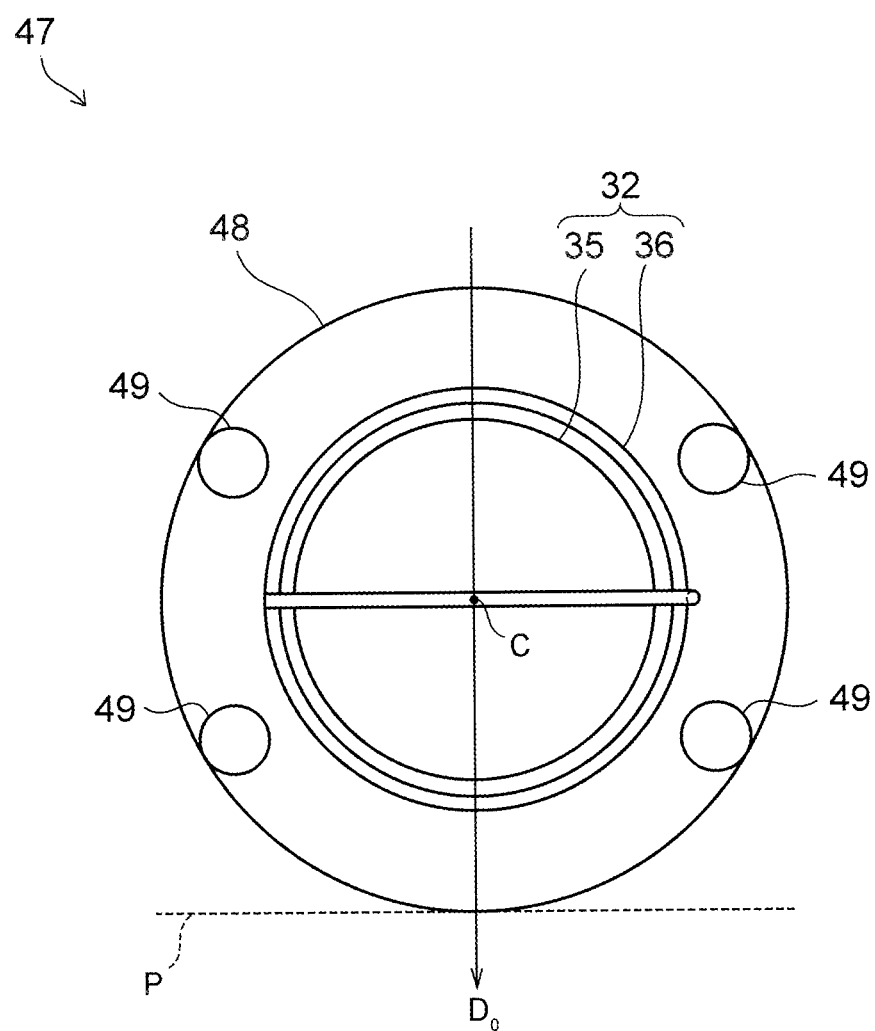
FIG. 28 is a cross-sectional view of an electronic device according to the third example of the second embodiment.

FIG. 28 is a cross-sectional view of an electronic device 47 according to the third example of this embodiment.

The electronic device 47 is provided with a plurality of weights 49 also in this example as with the second example illustrated in FIG. 27.

The way of arranging the weights 49 is similar to that described in FIG. 24. Accordingly, the sum of gravitational moments acting on the weights 49 becomes equal to 0 also in this case. Thus, the roll angle θ is set to −90° without the user's attention to the roll angle θ, and the efficiency E may be maximized as a consequence.

Figure 29:
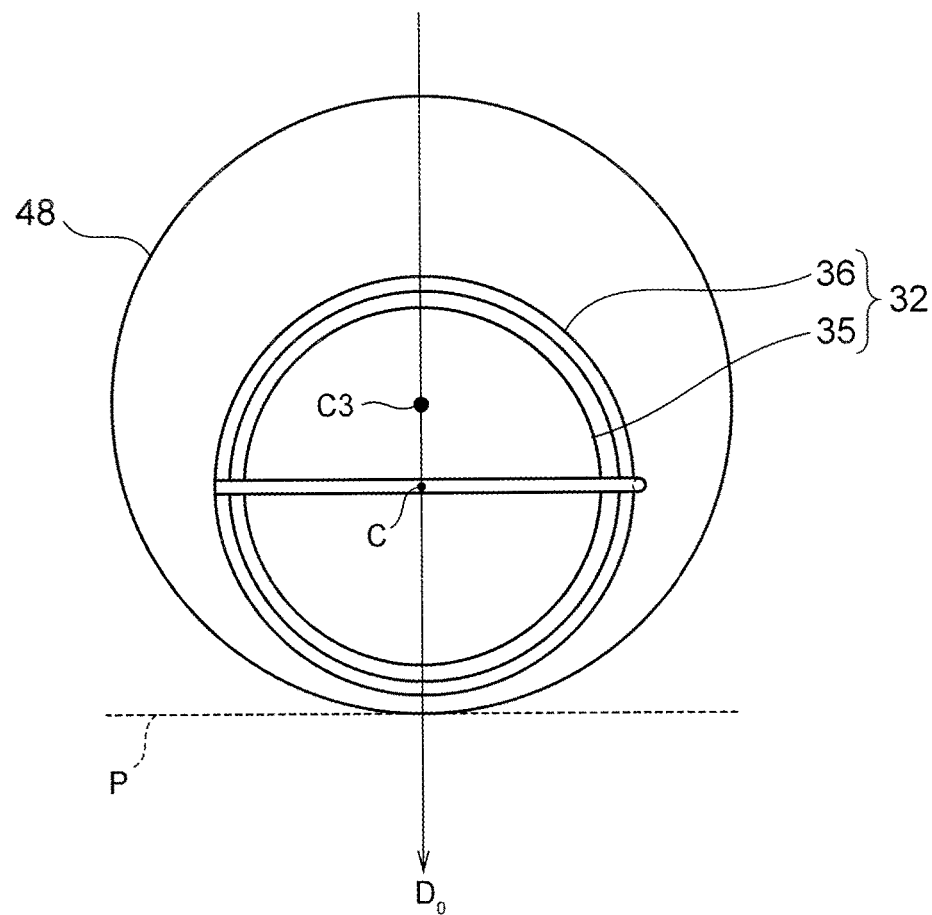
FIG. 29 is a cross-sectional view of an electronic device according to the fourth example of the second embodiment.

FIG. 29 is a cross-sectional view of an electronic device 47 according to the fourth example of this embodiment.

This electronic device 47 includes a cylindrical housing 48 which houses the rechargeable battery 32 of the first embodiment.

In this example as well, the center axis C of the battery body 35 is displaced from the center axis C3 of the housing 48 to the first direction $D_0$ as with the example of FIG. 25. Thus, the attitude of the rechargeable battery 32 is stabilized in the state where the first direction $D_0$ is oriented vertically downward due to the same reason as that described with reference to FIG. 25. Accordingly, the roll angle θ is automatically set to −90° and the efficiency E may be maximized as a consequence.

Third Embodiment

In the first and second embodiments, the power transfer takes place solely between the power transmitting coil 31 and the power receiving coil 36.

In contrast, a resonance coil is used together with the power transmitting coil 31 and the power receiving coil 36 in this embodiment. This embodiment is broadly categorized into first to third examples to be described below depending on the position to provide the resonance coil.

Figure 30:
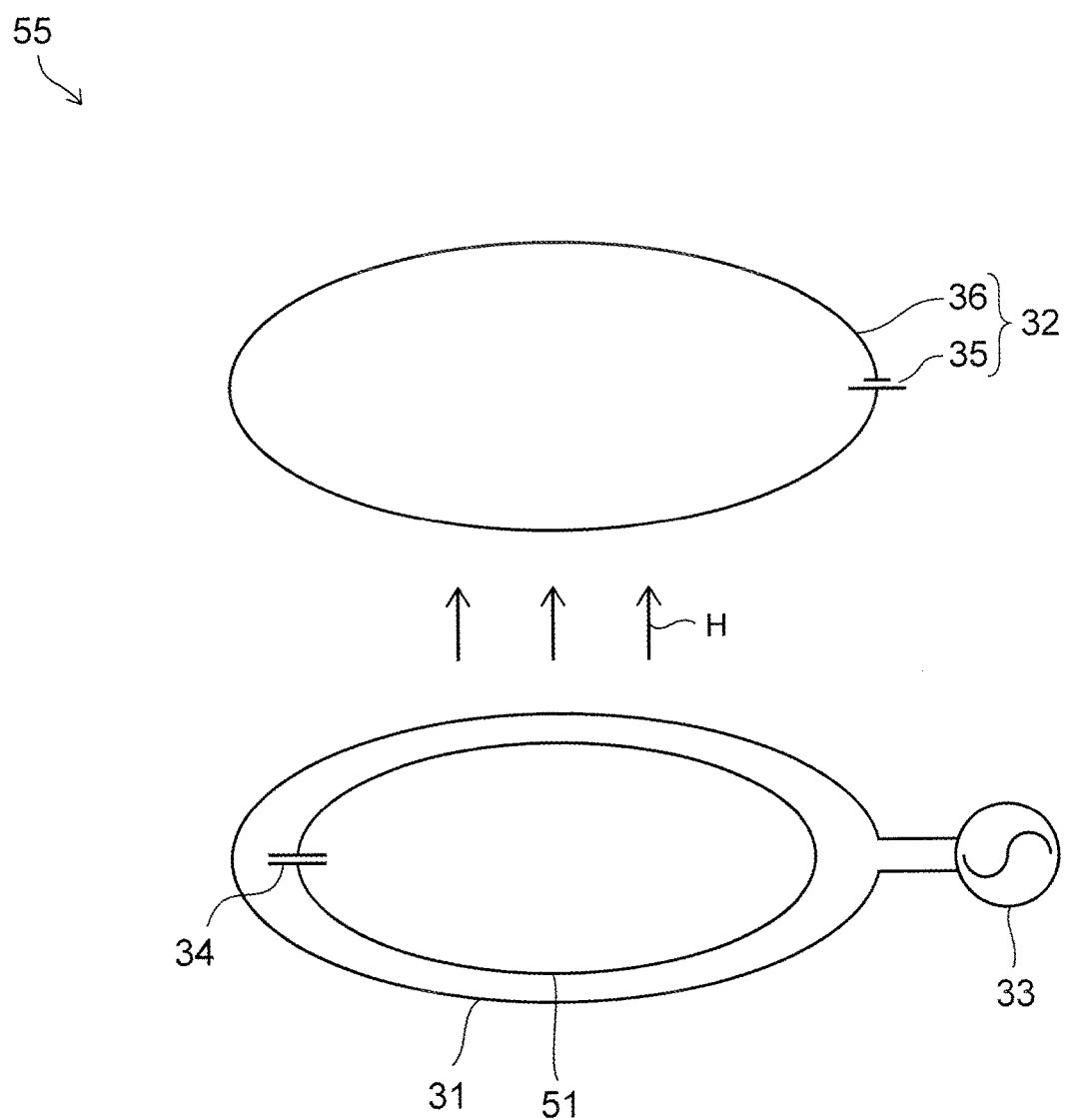
FIG. 30 is a schematic diagram of a charging system according to a first example of a third embodiment.

FIG. 30 is a schematic diagram of a charging system according to the first example of this embodiment.

Note that constituents in FIG. 30 which are the same as those explained in the first embodiment or the second embodiment will be denoted by the same reference numerals and description thereof will be omitted below.

In a charging system 55 according to this example, a first resonance coil 51 is provided in such a way as to extend parallel to the power transmitting coil 31, and the first resonance coil 51 is provided with the first capacitor 34 for resonance.

According to this configuration, the power is transferred between the power transmitting coil 31 and the first resonance coil 51 by an electromagnetic induction phenomenon. Then, the power is transferred between the first resonance coil 51 and the power receiving coil 36 by a magnetic field resonance phenomenon.

Here, impedance of the charging system 55 as a whole varies with a change in internal resistance of the battery body 35. One of the factors to change the internal resistance of the battery body 35 is a change in temperature of the battery body 35, for instance.

When the impedance of the charging system 55 changes, the power transfer efficiency between the power transmitting coil 31 and the power receiving coil changes as well. To maintain the efficiency at a high value, an impedance matching device may be provided to the power transmitting coil 31, so as to prevent a change in impedance in the system as a whole.

By using the three coils in the system as a whole like in this example, a range of the impedance adjustable by the impedance matching device is increased in comparison with a case which uses two coils. This may contribute to convenience for a user.

Figure 31:
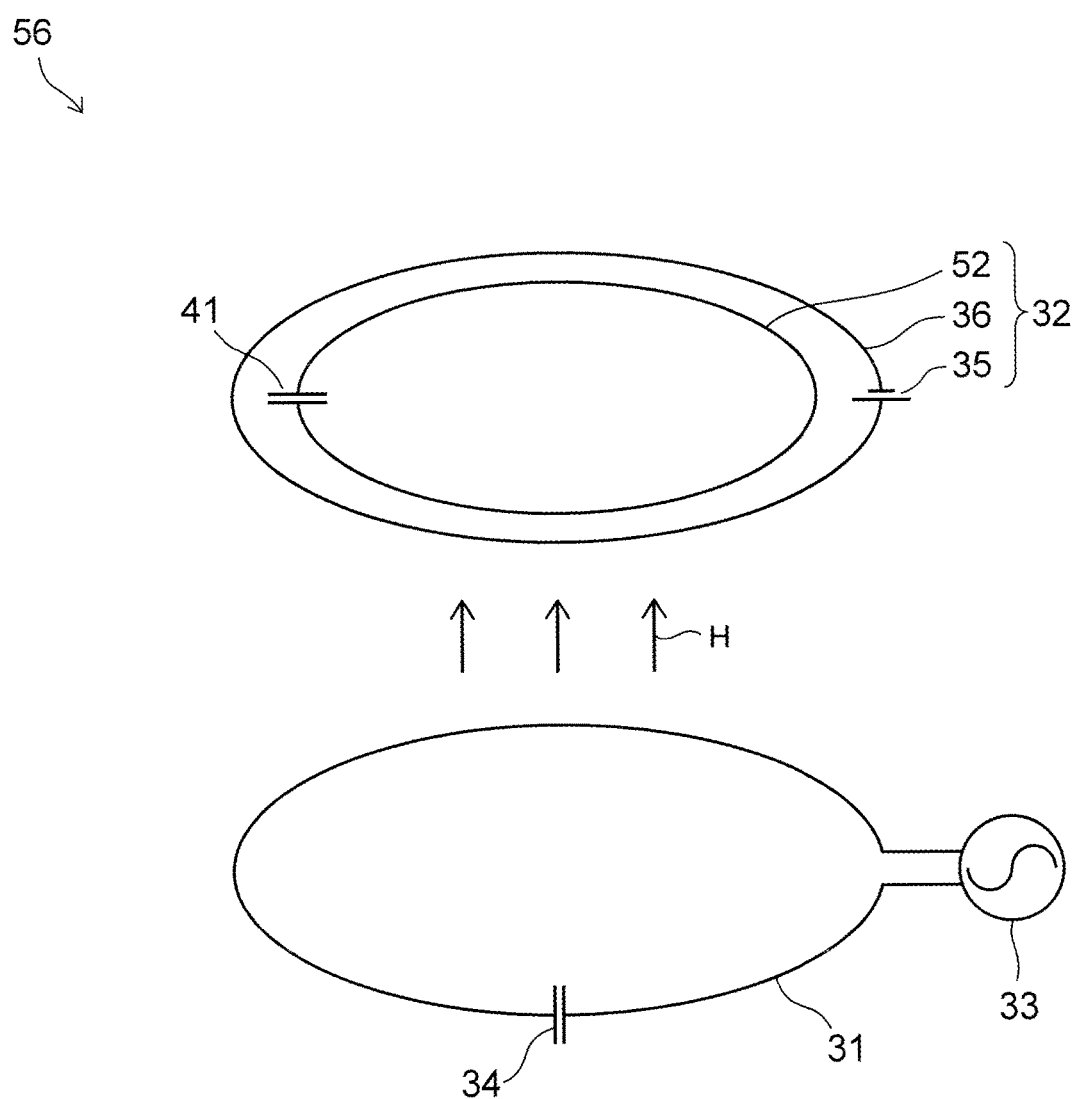
FIG. 31 is a schematic diagram of a charging system according to a second example of the third embodiment.

FIG. 31 is a schematic diagram of a charging system according to the second example of this embodiment.

Note that constituents in FIG. 31 which are the same as those explained in FIG. 30 will be denoted by the same reference numerals and description thereof will be omitted below.

In a charging system 56 according to this example, a second resonance coil 52 is provided in such a way as to extend parallel to the power receiving coil 36, and the second resonance coil 52 is provided with the second capacitor 41.

Figure 32:
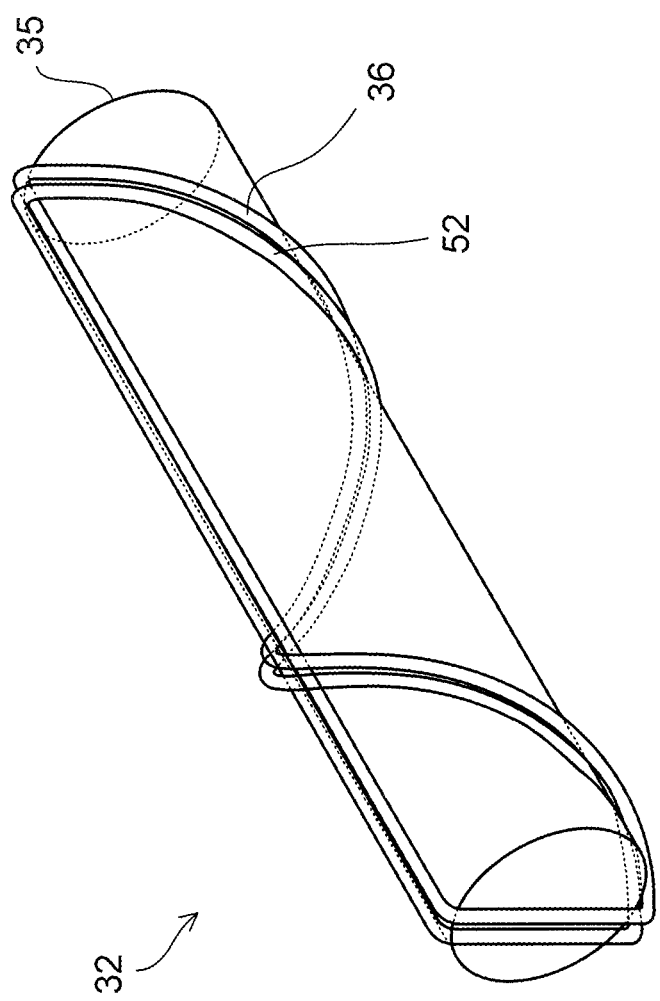
FIG. 32 is a perspective view illustrating an example of a way of winding a second resonance coil in the third embodiment.

FIG. 32 is a perspective view illustrating an example of a way of winding the second resonance coil 52.

As illustrated in FIG. 32, the second resonance coil 52 is helically wound around the battery body 35 as with the power receiving coil 36.

Reference is again made to FIG. 31.

According to the above-described charging system 56, the power is transferred between the power receiving coil 36 and the second resonance coil 52 by an electromagnetic induction phenomenon. Then, the power is transferred between the power transmitting coil 31 and the second resonance coil 52 by a magnetic field resonance phenomenon.

By using the three coils as described above, a range of the impedance adjustment in the system as a whole may be increased due to the same reason as that described in the first example (see FIG. 30).

Figure 33:
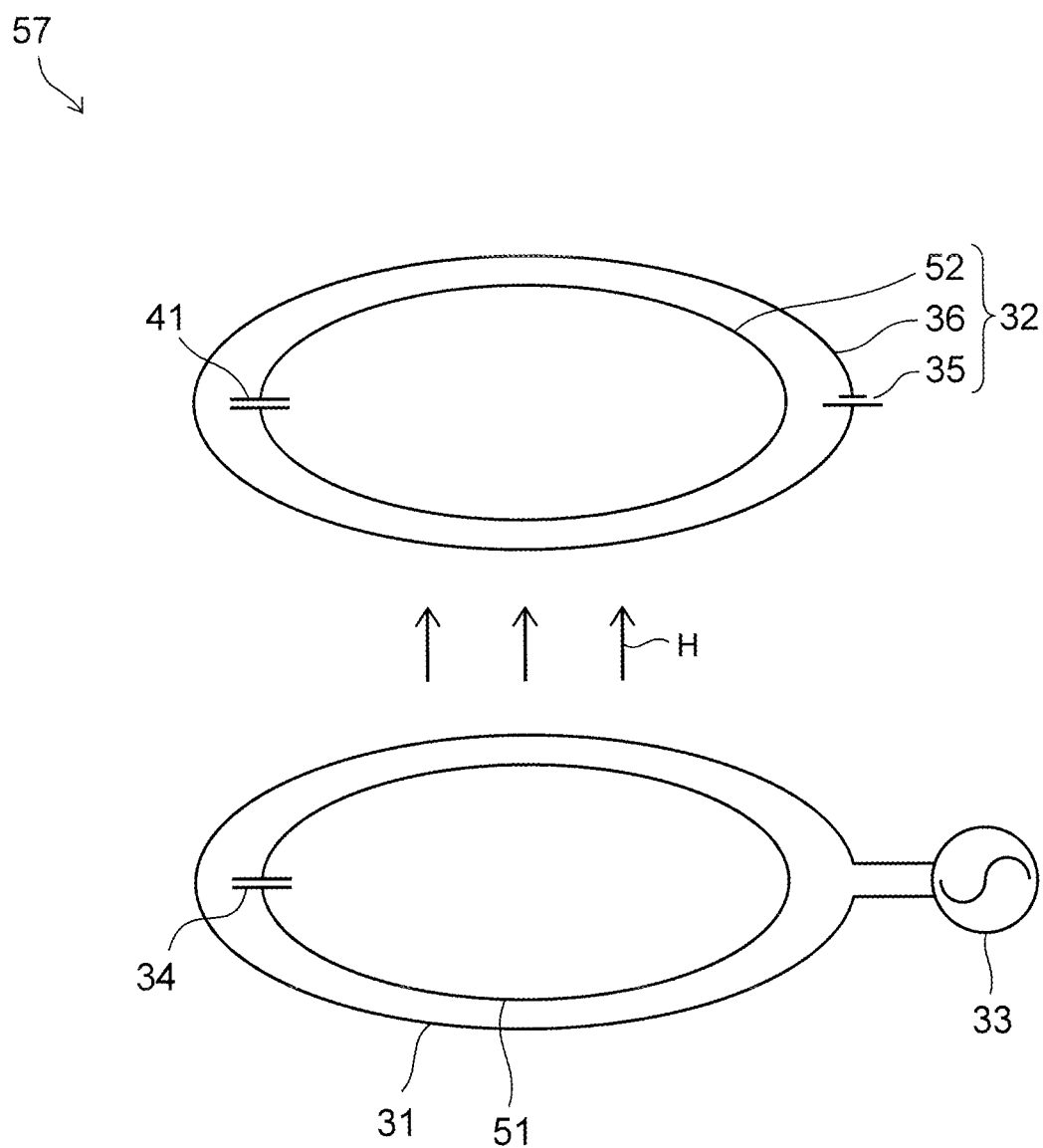
FIG. 33 is a schematic diagram of a charging system according to a third example of the third embodiment.

FIG. 33 is a schematic diagram of a charging system according to the third example of this embodiment.

Note that constituents in FIG. 33 which are the same as those explained in FIG. 30 or FIG. 31 will be denoted by the same reference numerals used in the corresponding drawing and description thereof will be omitted below.

A charging system 57 according to this example is a combination of the first example and the second example, which employs the first resonance coil and the second resonance coil 52 described above. As a consequence, four coils are used in the system as a whole.

In this case, the power is transferred between the first resonance coil 51 and the second resonance coil 52 by a magnetic field resonance phenomenon.

By using the four coils as described above, a range of the impedance adjustable in the system as a whole may be further increased in comparison with the first example or the second example which uses the three coils.

Fourth Embodiment

In the magnetic field resonance mode described in the first to third embodiments, the alternating current is supplied to the power transmitting coil in order to generate the magnetic field. Accordingly, the induced current induced in the power receiving coil is also the alternating current.

In this embodiment, the induced current is converted into a direct current by using a rectifier circuit as described below, and then the rechargeable battery is charged by the direct current.

Figure 34:
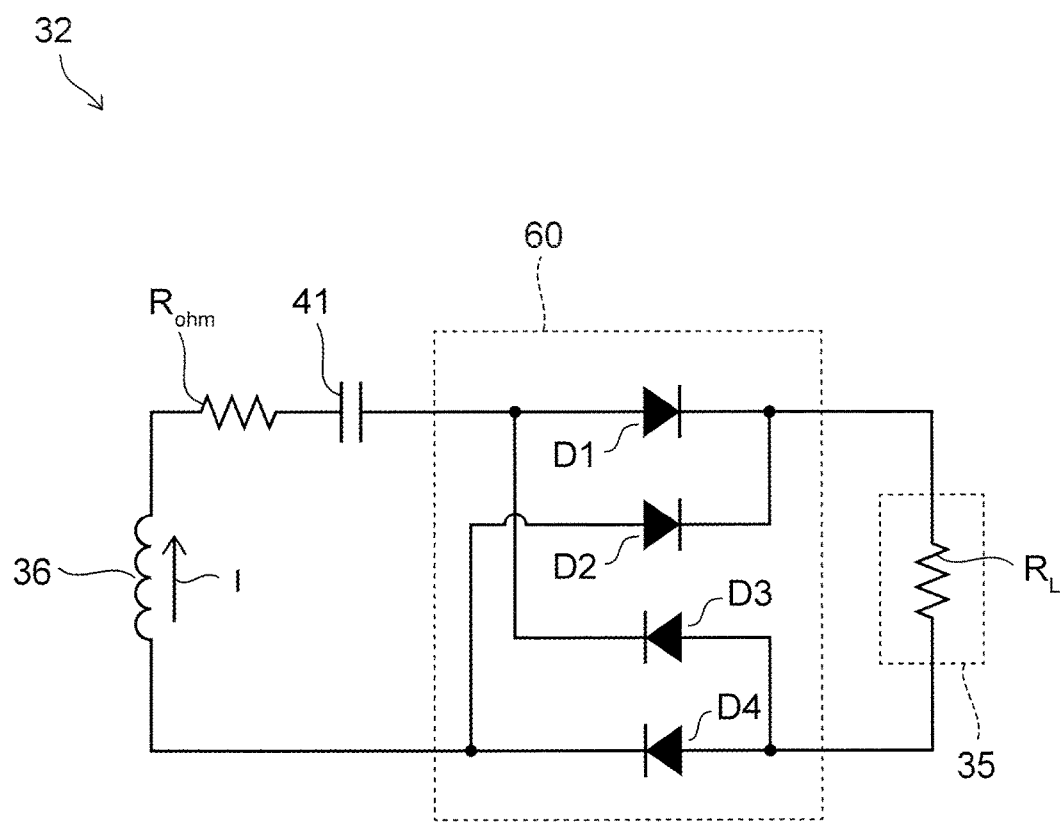
FIG. 34 is a circuit diagram of a rechargeable battery according to a first example of a fourth embodiment.

FIG. 34 is a circuit diagram of a rechargeable battery 32 according to a first example of this embodiment.

This rechargeable battery 32 includes: the battery body 35, the power receiving coil 36, and the second capacitor 41 which are described in the first embodiment; and a rectifier circuit 60. It is to be noted that resistance $R_{ohm}$ is resistance of the power receiving coil 36 and resistance $R_L$ is internal resistance of the battery body 35.

The rectifier circuit 60 is a full-wave rectifier circuit formed by bridge connection of first to four diodes D1 to D4, and has a function to pass an induced current I, which flows in the power receiving coil 36, in one direction.

Figure 35:
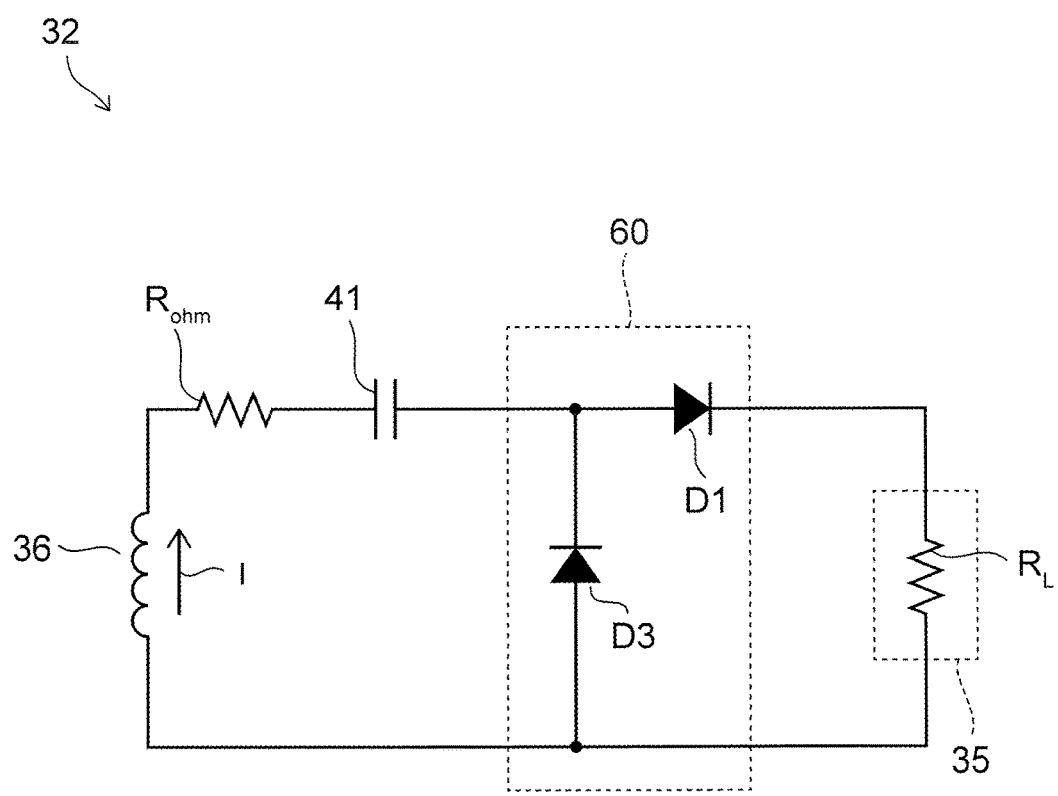
FIG. 35 is a circuit diagram of a rechargeable battery according to a second example of the fourth embodiment.

FIG. 35 is a circuit diagram of a rechargeable battery 32 according to a second example of this embodiment.

Note that constituents in FIG. 35 which are the same as those explained in FIG. 34 will be denoted by the same reference numerals used in FIG. 34 and description thereof will be omitted below.

In this example, the second diode D2 and the fourth diode D4 are removed from the rectifier circuit 60 in the first example (see FIG. 34). Thus, the rectifier circuit 60 is formed into a half-wave rectifier circuit.

Figure 36:
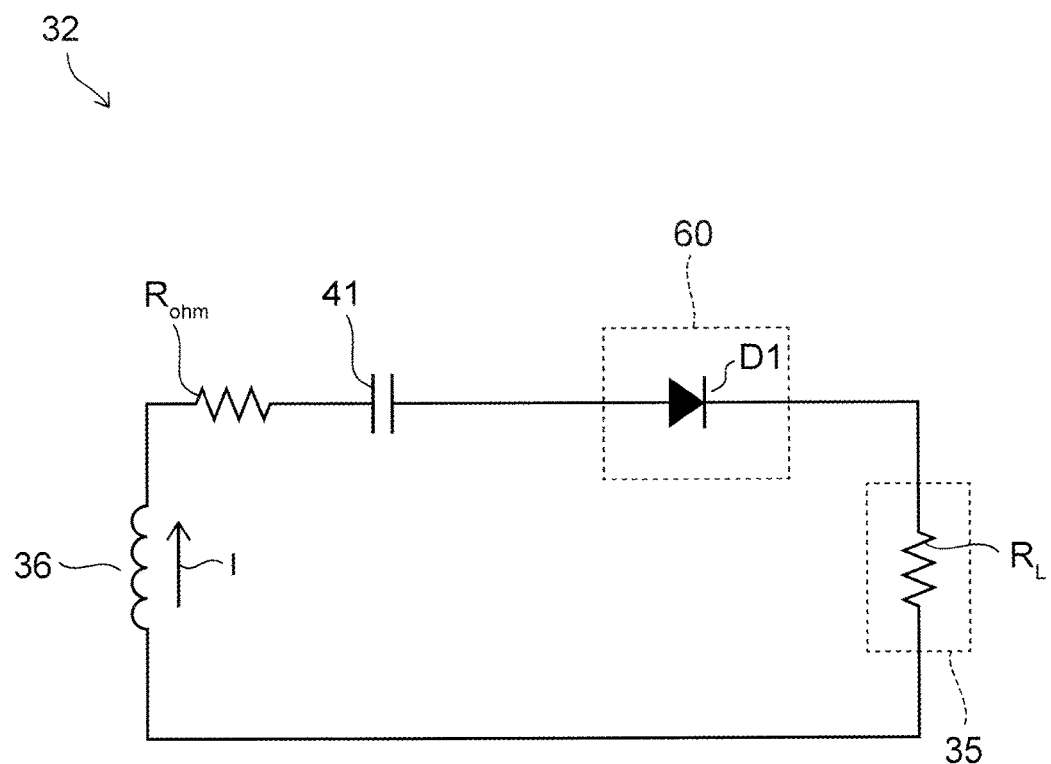
FIG. 36 is a circuit diagram of a rechargeable battery according to a third example of the fourth embodiment.

FIG. 36 is a circuit diagram of a rechargeable battery 32 according to a third example of this embodiment.

Note that constituents in FIG. 36 which are the same as those explained in FIG. 34 or FIG. 35 will be denoted by the same reference numerals used in the corresponding drawing and description thereof will be omitted below.

In this example, only the first diode D1 is used as the rectifier circuit 60, which passes the induced current I in a forward direction of the first diode D1.

In any of the first to third examples described above, the induced current I is rectified into the direct current. Accordingly, it is possible to charge the battery body 35 by the direct current.

Although the diodes are used in the rectifier circuit 60 in the first to third examples, it is preferable to reduce the number of diodes as much as possible in order to reduce a cost of the rechargeable battery 32. In light of the cost reduction, the most preferable case is the third example (see FIG. 36) which uses only one diode.

In the meantime, the rectifier circuit 60 according to any one of the first to third examples may also be used in combination with each of the first to third examples of the third embodiment.

The first to third examples of the third embodiment are categorized into a case in which two coils are provided to the battery body 35 (FIG. 31 and FIG. 33) and a case in which one coil is provided to the battery body 35 (FIG. 30)

The following Table 2 is a table which sets out aspects of combinations obtained by combining each of the cases categorized by the number of the coils provided to the battery body 35 with each of the first to third examples of the third embodiment.

TABLE 2

|  | First Example (FIG. 34, full-wave rectification) | Second Example (FIG. 35, half-wave rectification) | Third Example (FIG. 36, half-wave rectification) |
| --- | --- | --- | --- |
| 2 coils (FIG. 31, FIG. 33) | good | good | very good |
| 1 coil (FIG. 30) | good | good | poor |

Here, the combination evaluated as "poor" in Table 2 means that it is not possible to supply power by means of magnetic field coupling.

As described above, the cost reduction of the rechargeable battery 32 may be achieved by reducing the number of diodes as much as possible. Accordingly, as evaluated as "very good" in Table 2, it is most preferable in light of the cost reduction to apply the third example using only one diode to the configuration in which two coils are provided to the battery body 35.

Other Embodiments

Methods of charging the rechargeable battery 32 are not limited to the first to fourth embodiments described above.

Figure 37:
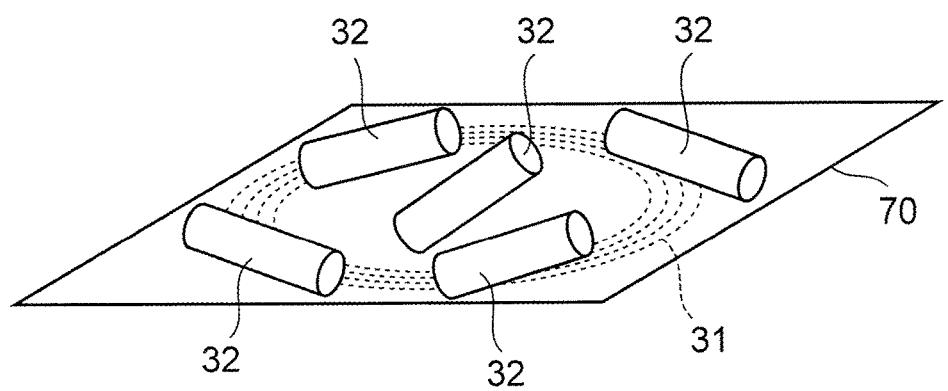
FIG. 37 is a schematic diagram illustrating a method of charging rechargeable batteries according to another embodiment.

For instance, FIG. 11 illustrates the example of charging one rechargeable battery 32 in accordance with the magnetic field resonance mode. Instead, a plurality of rechargeable batteries 32 may be charged at a time as illustrated in FIG. 37. In this case, the power transmitting coil 31 may be provided to a charge table 70 which is parallel to the horizontal plane, and the plurality of rechargeable batteries 32 may be rolled on the charge table 70. Since the range of the dead angle for each rechargeable battery 32 is reduced as described above, the roll angle of each of the rechargeable batteries 32 is less likely to fall into the range of the dead angle even when the rechargeable batteries 32 are rolled as mentioned above. As a consequence, each rechargeable battery 32 may be efficiently charged in this case.

Moreover, the usage of the rechargeable battery 32 is not limited to those described in the first to fourth embodiments.

Figure 38:
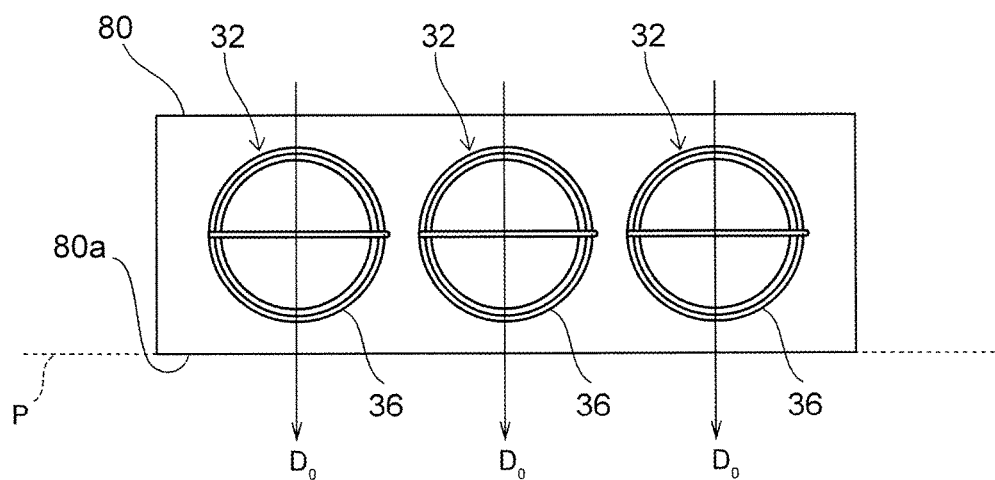
FIG. 38 is a cross-sectional view of a battery pack according to another embodiment.

FIG. 38 is a cross-sectional view illustrating another example of the usage of the rechargeable battery 32. In this example, a plurality of rechargeable batteries 32 are used collectively as a battery pack 80. The battery pack 80 has a rectangular sectional shape, for example.

Meanwhile, it is also possible to provide the battery pack 80 with a flat surface 80a in such a way that the flat surface 80a orthogonally crosses the first direction $D_O$ of each of the rechargeable batteries 32. In this way, it is possible to maximize the efficiency E of each rechargeable battery 32 by disposing the battery pack 80 on the horizontal plane P with the flat surface 80a down as with the configuration described in the second embodiment.

All examples and conditional language recited herein are intended for the pedagogical purposes of aiding the reader in understanding the invention and the concepts contributed by the inventor to further the art, and are not to be construed as limitations to such specifically recited examples and conditions, nor does the organization of such examples in the specification relate to a showing of the superiority and inferiority of the invention. Although one or more embodiments of the present invention have been described in detail, it should be understood that the various changes, substitutions, and alterations could be made hereto without departing from the spirit and scope of the invention.

What is claimed is:

1. A rechargeable battery comprising:
a cylindrical battery body including an outer peripheral side surface having a circular cross section with a diameter;
a power receiving coil wound in at most a single layer around the outer peripheral side surface, and electrically connected to the battery body; and
a resonance coil provided on the outer peripheral side surface, wherein
the power receiving coil is helically wound around the outer peripheral side surface while forming a space from which the outer peripheral side surface is exposed,
the resonance coil is helically wound around the outer peripheral side surface along the power receiving coil,
the number of turns of the power receiving coil is equal to 1.5, and
a first pitch corresponding to one round of the power receiving coil is greater than a second pitch corresponding to a half round of the power receiving coil, and greater than the diameter of the battery body.

2. The rechargeable battery according to claim 1, wherein a ratio of a length in a longitudinal direction of the battery body to the diameter of the battery body is equal to or greater than 3.5.

3. The rechargeable battery according to claim 1, wherein the power receiving coil includes a first end portion and a second end portion, and
the rechargeable battery further comprises:
a conducting wire provided on the outer peripheral side surface, extending in a longitudinal direction of the battery body, and electrically connecting the first end portion and the second end portion.

4. The rechargeable battery according to claim 3, wherein
among a plurality of eye directions to see through the battery body, there exists a first direction in which the conducting wire and a portion of the power receiving coil hidden behind the battery body do not cross each other.

5. The rechargeable battery according to claim 4, further comprising:
a casing to house the battery body and the power receiving coil, wherein
the casing includes a flat surface provided orthogonally to the first direction.

6. The rechargeable battery according to claim 4, further comprising:
a cylindrical casing to house the battery body and the power receiving coil, wherein
a center axis of the battery body is displaced from a center axis of the casing to the first direction.

7. The rechargeable battery according to claim 4, further comprising:
a plurality of weights, wherein
when the first direction is oriented vertically downward, a sum of gravitational moments, acting on the weights, about a center axis of the battery body becomes equal to 0.

8. The rechargeable battery according to claim 1, wherein the battery body includes:
a tube made of metal; and
a magnetic sheet surrounding the tube, wherein
a surface of the magnetic sheet is the outer peripheral side surface.

9. The rechargeable battery according to claim 1, further comprising:
a rectifier circuit provided between the battery body and the power receiving coil, and configured to pass a current flowing in the power receiving coil in one direction, wherein
the rectifier circuit includes only one diode with a forward direction of the one diode being aligned with the one direction.

10. The rechargeable battery according to claim 1, further comprising:
a capacitor provided in the resonance coil, and configured to form an LC resonance circuit in conjunction with the resonance coil.

11. A charging system comprising:
a power transmitting coil wound around a first axis;
a cylindrical battery body including an outer peripheral side surface having a circular cross section with a diameter, and defining a second axis as a longitudinal direction of the battery body;
a power receiving coil wound in at most a single layer around the outer peripheral side surface, and electrically connected to the battery body; and
a resonance coil provided on the outer peripheral side surface, wherein
the second axis is perpendicular to the first axis,
the power receiving coil is helically wound around the outer peripheral side surface while forming a space from which the outer peripheral side surface is exposed,
the resonance coil is helically wound around the outer peripheral side surface along the power receiving coil,
the number of turns of the power receiving coil is equal to 1.5, and
a first pitch corresponding to one round of the power receiving coil is greater than a second pitch corresponding to a half round of the power receiving coil, and greater than the diameter of the battery body.

12. An electronic device comprising:
a rechargeable battery including
a cylindrical battery body including an outer peripheral side surface having a circular cross section with a diameter,
a power receiving coil wound in at most a single layer around the outer peripheral side surface, and electrically connected to the battery body, and
a resonance coil provided on the outer peripheral side surface, wherein
the power receiving coil is helically wound around the outer peripheral side surface while forming a space from which the outer peripheral side surface is exposed,
the resonance coil is helically wound around the outer peripheral side surface along the power receiving coil,
the number of turns of the power receiving coil is equal to 1.5, and a first pitch corresponding to one round of the power receiving coil is greater than a second pitch corresponding to a half round of the power receiving coil, and greater than the diameter of the battery body.

13. The electronic device according to claim 12, wherein the power receiving coil includes a first end portion and a second end portion, and the rechargeable battery further includes a conducting wire provided on the outer peripheral side surface, extending in a longitudinal direction of the battery body, and electrically connecting the first end portion and the second end portion.

14. The electronic device according to claim 13, wherein among a plurality of eye directions to see through the battery body, there exists a first direction in which the conducting wire and a portion of the power receiving coil hidden behind the battery body do not cross each other.

15. The electronic device according to claim 14, further comprising:

a housing in which the rechargeable battery is housed, wherein the housing includes a flat surface provided orthogonally to the first direction.

16. The electronic device according to claim 14, further comprising:

a cylindrical housing in which the rechargeable battery is housed, wherein a center axis of the battery body is displaced from a center axis of the housing to the first direction.

17. The electronic device according to claim 14, further comprising:

a plurality of weights, wherein when the first direction is oriented vertically downward, a sum of gravitational moments about a center axis of a housing acting on the weights becomes equal to 0.

* * * * *